(12) United States Patent
Chen

(10) Patent No.: US 10,492,261 B2
(45) Date of Patent: Nov. 26, 2019

(54) LIFESTYLE SECURITY LIGHT

(71) Applicant: VAXCEL INTERNATIONAL CO., LTD., Carol Stream, IL (US)

(72) Inventor: Chia-Teh Chen, Taipei (TW)

(73) Assignee: Vaxcel International Co., Ltd., Carol Stream, IL (US)

( * ) Notice: Subject to any disclaimer, the term of this patent is extended or adjusted under 35 U.S.C. 154(b) by 0 days.

(21) Appl. No.: 16/234,983

(22) Filed: Dec. 28, 2018

(65) Prior Publication Data

US 2019/0141812 A1     May 9, 2019

Related U.S. Application Data

(63) Continuation-in-part of application No. 16/201,219, filed on Nov. 27, 2018, which is a continuation of
(Continued)

(51) Int. Cl.
*H05B 37/02* (2006.01)
*H05B 33/08* (2006.01)
(Continued)

(52) U.S. Cl.
CPC ............ *H05B 33/0854* (2013.01); *F21S 9/03* (2013.01); *F21V 17/02* (2013.01); *G08B 5/36* (2013.01); *G08B 13/1895* (2013.01); *G08B 15/00* (2013.01); *G08B 15/002* (2013.01); *H02J 7/35* (2013.01); *H05B 33/083* (2013.01); *H05B 33/0809* (2013.01); *H05B 33/0815* (2013.01); *H05B 33/0818* (2013.01); *H05B 33/0824* (2013.01); *H05B 33/0827* (2013.01); *H05B 33/0872* (2013.01); *H05B 37/02* (2013.01); *H05B 37/0218* (2013.01); *H05B 37/0227* (2013.01); *H05B 37/0281* (2013.01); *H05B 39/042* (2013.01); *H05B 39/044* (2013.01); *F21Y 2115/10* (2016.08);
(Continued)

(58) Field of Classification Search
CPC ............ H05B 33/0815; H05B 33/0845; H05B 33/0848; H05B 37/0227; H05B 37/0281
USPC ................ 315/149, 152, 154, 307, 308, 312
See application file for complete search history.

(56) References Cited

U.S. PATENT DOCUMENTS

| | | | |
|---|---|---|---|
| 6,222,191 B1 | 4/2001 | Myron et al. | |
| 7,924,155 B2 | 4/2011 | Soccoli et al. | |

(Continued)

*Primary Examiner* — Tung X Le
(74) *Attorney, Agent, or Firm* — Rosenberg, Klein & Lee

(57) ABSTRACT

A security light technology to configure an automatically setting timer used for selecting and operating a light-on duration activated by a motion sensor is disclosed. The disclosed uses a shutoff transition mode to eliminate a hassle or hardship caused by an unexpected "shutoff" of illumination. The shutoff transition mode also serves a communication interface between the motion sensor and an occupant remaining in a detection space such that the occupant can interrupt the shutoff transition mode. The disclosed uses a software algorithm to detect and learn the motion characteristics of occupants in the detection space and thereby to automatically set a timer to operate the light-on duration triggered by a motion intrusion. The disclosed also teaches a dual mode motion sensing light configured with a short timer to manage a pathway illumination and a long timer to manage an occupancy illumination bridged by the shutoff transition mode.

28 Claims, 22 Drawing Sheets

Related U.S. Application Data application No. 15/856,468, filed on Dec. 28, 2017, now Pat. No. 10,187,947, which is a continuation of application No. 15/637,175, filed on Jun. 29, 2017, now Pat. No. 10,165,643, which is a continuation of application No. 15/230,752, filed on Aug. 8, 2016, now Pat. No. 9,743,480, which is a continuation of application No. 14/478,150, filed on Sep. 5, 2014, now Pat. No. 9,445,474, which is a continuation of application No. 13/222,090, filed on Aug. 31, 2011, now Pat. No. 8,866,392.

(51) Int. Cl.

| | |
|---|---|
| *F21V 17/02* | (2006.01) |
| *G08B 5/36* | (2006.01) |
| *G08B 13/189* | (2006.01) |
| *G08B 15/00* | (2006.01) |
| *H05B 39/04* | (2006.01) |
| *H02J 7/35* | (2006.01) |
| *F21S 9/03* | (2006.01) |
| *F21Y 115/10* | (2016.01) |
| *G08B 13/00* | (2006.01) |

(52) U.S. Cl.
CPC ............ *G08B 13/00* (2013.01); *G08B 13/189* (2013.01); *Y02B 20/40* (2013.01); *Y02B 20/44* (2013.01); *Y02B 20/46* (2013.01)

(56) References Cited

U.S. PATENT DOCUMENTS

| | | | |
|---|---|---|---|
| 8,143,567 B2 | 3/2012 | Williams et al. | |
| 8,288,953 B1* | 10/2012 | Mei .................... | H05B 33/0851 |
| | | | 315/209 R |
| 9,006,982 B2 | 4/2015 | Chen | |
| 2006/0273741 A1* | 12/2006 | Stalker, III ................ | G05F 1/00 |
| | | | 315/291 |
| 2009/0189539 A1* | 7/2009 | Deng ................. | H05B 33/0812 |
| | | | 315/294 |
| 2015/0286948 A1 | 10/2015 | Luca et al. | |

* cited by examiner

| Brand | $V_F$ Min. | $V_F$ Max. | Product Series | Information Source |
|---|---|---|---|---|
| CREE | 2.9V | 3.3V | J Series LEDs/J Series 2835 | www.cree.com/led-components/products/j2835/jseries-2835 |
| LUMILEDS | 2.7V | 3.3V | LUXEON 2835 Line | www.lumileds.com/luxeon2835line |
| SAMSUNG | 2.9V | 3.3V | KM281BA+ | www.samsung.com/app/components/products/j2835/jseries-2835 |
| OSRAM | 2.7V | 3.3V | DURIS E/DURISR E 2835 | www.osram.com/app/product_selector/#!?query=DORIS%20E%202835&sortField=&sortOrder=&start-0&filters=productbrand,DORIS,E&filters-productbrand,DORIS |

FIG. 9

LIFESTYLE SECURITY LIGHT

CROSS-REFERENCE TO RELATED APPLICATIONS

This Application is a continuation in part application of prior application Ser. No. 16/201,219 filed on Nov. 27, 2018, currently pending, which is a continuation application of prior application Ser. No. 15/856,468 filed on Dec. 28, 2017, currently pending, which is a continuation application of prior application Ser. No. 15/637,175 filed on Jun. 29, 2017, issued as U.S. patent Ser. No. 10/165,643 on Dec. 25, 2018, which is a continuation application of prior application Ser. No. 15/230,752 filed on Aug. 8, 2016, issued as U.S. Pat. No. 9,743,480 on Aug. 22, 2017, which is a continuation application of prior application Ser. No. 14/478,150 filed on Sep. 5, 2014, issued as U.S. Pat. No. 9,445,474 on Sep. 13, 2016, which is a continuation application of prior application Ser. No. 13/222,090 filed on Aug. 31, 2011, issued as U.S. Pat. No. 8,866,392 on Oct. 21, 2014.

BACKGROUND

1. Technical Field

The present disclosure relates to a lighting apparatus, in particular, to a two-level security LED light with motion sensor.

2. Description of Related Art

Lighting sources such as the fluorescent lamps, the incandescent lamps, the halogen lamps, and the light-emitting diodes (LED) are commonly found in lighting apparatuses for illumination purpose. Photo resistors are often utilized in outdoor lighting applications for automatic illuminations, known as the Photo-Control (PC) mode. Timers may be used in the PC mode for turning off the illumination or for switching to a lower level illumination of a lighting source after the lighting source having delivered a high level illumination for a predetermined duration, referred as the Power-Saving (PS) mode. Motion sensors are often used in the lighting apparatus for delivering full-power illumination thereof for a short duration when a human motion is detected, then switching back to the PS mode. Illumination operation controls such as auto-illumination in accordance to the background brightness detection, illumination using timer, illumination operation control using motion sensing results (e.g., dark or low luminous power to fully illuminated), and brightness control are often implemented by complex circuitries. In particular, the design and construction of LED drivers are still of a complex technology with high fabrication cost.

Therefore, how to develop a simple and effective design method on illumination controls such as enhancing contrast in illumination and color temperature for various types lighting sources, especially the controls for LEDs are the topics of the present disclosure.

SUMMARY

An exemplary embodiment of the present disclosure provides a two-level LED security light with motion sensor which may switch to high level illumination in the Power-Saving (PS) mode for a predetermined duration time when a human motion is detected thereby achieve warning purpose using method of electric current or lighting load adjustment. Furthermore, prior to the detection of an intrusion, the LED security light may be constantly in the low level illumination to save energy.

An exemplary embodiment of the present disclosure provides a two-level LED security light including a power supply unit, a light sensing control unit, a motion sensing unit, a loading and power control unit, and a light-emitting unit. The light-emitting unit further includes one or a plurality of series-connected LEDs; when the light sensing control unit detects that an ambient light is lower than a predetermined value, the loading and power control unit turns on the light-emitting unit to generate a high level or a low level illumination; when the light sensing control unit detects that the ambient light is higher than the predetermined value, the loading and power control unit turns off the light-emitting unit; when the motion sensing unit detects a human motion in the PS mode, the loading and power control unit increases the electric current that flows through the light-emitting unit so as to generate the high level illumination for a predetermined duration.

Another exemplary embodiment of the present disclosure provides a two-level LED security light including a power supply unit, a light sensing control unit, a motion sensing unit, a loading and power control unit, a light-emitting unit. The light-emitting unit includes a plurality of series-connected LEDs. When the light sensing control unit detects that an ambient light is lower than a predetermined value, the loading and power control unit turns on a portion or all the LEDs of the light-emitting unit to generate a low level or a high level illumination; when the light sensing control unit detects that the ambient light is higher than the predetermined value, the loading and power control unit turns off all the LEDs in the light-emitting unit; when the motion sensing unit detects a human motion in the PS mode, the loading and power control unit turns on a plurality of LEDs in the light-emitting unit and generates the high level illumination for a predetermine duration. An electric current control circuit is integrated in the exemplary embodiment for providing constant electric current to drive the LEDS in the light-emitting unit.

One exemplary embodiment of the present disclosure provides a two-level LED security light including a power supply unit, a light sensing control unit, a motion sensing unit, a loading and power control unit, and a light-emitting unit. The light-emitting unit includes one or a plurality of parallel-connected alternating current (AC) LEDs. A phase controller is coupled between the described one or a plurality parallel-connected ACLEDs and AC power source. The loading and power control unit may through the phase controller control the average power of the light-emitting unit; when the light sensing control unit detects that an ambient light is lower than a predetermined value, the loading and power control unit turns on the light-emitting unit to generate a high level or a lower level illumination; when the light sensing control unit detects that the ambient light is higher than the predetermined value, the loading and power control unit turns off the light-emitting unit; when the motion sensing unit detects a human motion in the PS mode, the loading and power control unit increases the average power of the light-emitting unit thereby generates the high level illumination for a predetermine duration.

According to an exemplary embodiment of the present disclosure, a two-level LED security light includes a power supply unit, a light sensing control unit, a motion sensing unit, a loading and power control unit, and a light-emitting unit. The light-emitting unit includes X high wattage ACLEDs and Y low wattage ACLEDs connected in parallel.

When the light sensing control unit detects that an ambient light is lower than a predetermined value, the loading and power control unit turns on the plurality of low wattage ACLEDs to generate a low level illumination; when the light sensing control unit detects that the ambient light is higher than a predetermined value, the loading and power control unit turns off the light-emitting unit; when the motion sensor detects an intrusion, the loading and power control unit turns on both the high wattage ACLEDs and the low wattage ACLEDs at same time thereby generates a high level illumination for a predetermine duration, wherein X and Y are of positive integers.

According to an exemplary embodiment of the present disclosure, a two-level LED security light with motion sensor includes a power supply unit, a light sensing control unit, a motion sensing unit, a loading and power control unit, and a light-emitting unit. The light-emitting unit includes a rectifier circuit connected between one or a plurality of parallel-connected AC lighting sources and AC power source. The loading and power control unit may through the rectifier circuit adjust the average power of the light-emitting unit. When the light sensing control unit detects that an ambient light is lower than a predetermined value, the loading and power control unit turns on the light-emitting unit to generate a low level illumination; when the light sensing control unit detects that the ambient light is higher than the predetermined value, the loading and power control unit turns off the light-emitting unit; when the motion sensing unit detects an intrusion, the loading and power control unit increases the average power of the light-emitting unit thereby generates a high level illumination for a predetermine duration. The rectifier circuit includes a switch parallel-connected with a diode, wherein the switch is controlled by the loading and power control unit.

To sum up, a two-level LED security light with motion sensor provided by an exemplary embodiment in the preset disclosure, may execute Photo-Control (PC) and Power-Saving (PS) modes. When operates in the PC mode, the lighting apparatus may auto-illuminate at night and auto turn off at dawn. The PC mode may generate a high level illumination for a predetermined duration then automatically switch to the PS mode by a control unit to generate a low level illumination. When the motion sensor detects a human motion, the disclosed LED security light may immediately switch to the high level illumination for a short predetermined duration thereby achieve illumination or warning effect. After the short predetermined duration, the LED security light may automatically return to the low level illumination for saving energy. The PC mode may alternatively generate the low level illumination to begin with and when the motion sensor is detected the disclosed LED security may immediately switch to a high level illumination for a short predetermined duration to provide security protection and then automatically return to the low level illumination.

In order to further understand the techniques, means and effects of the present disclosure, the following detailed descriptions and appended drawings are hereby referred, such that, through which, the purposes, features and aspects of the present disclosure can be thoroughly and concretely appreciated; however, the appended drawings are merely provided for reference and illustration, without any intention to be used for limiting the present disclosure.

BRIEF DESCRIPTION OF THE DRAWINGS

The accompanying drawings are included to provide a further understanding of the present disclosure, and are incorporated in and constitute a part of this specification. The drawings illustrate exemplary embodiments of the present disclosure and, together with the description, serve to explain the principles of the present disclosure.

FIG. 9 is a data sheet showing data of the minimum forward voltages and maximum forward voltages collected from various LED manufacturers.

DESCRIPTION OF THE EXEMPLARY EMBODIMENTS

Figure 1:
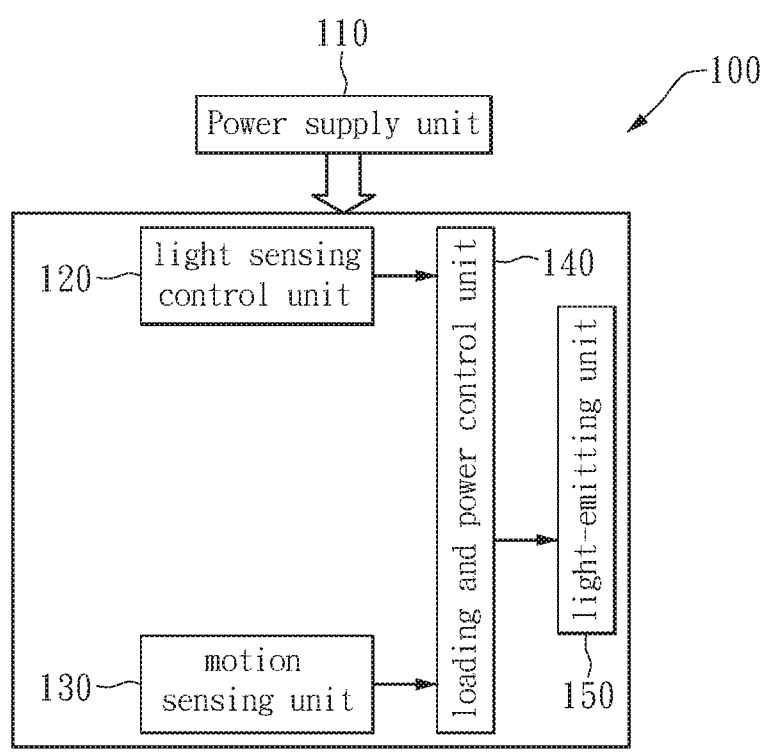
FIG. 1 schematically illustrates a block diagram of a two-level LED security light in accordance with an exemplary embodiment of the present disclosure.
Figure 1A:
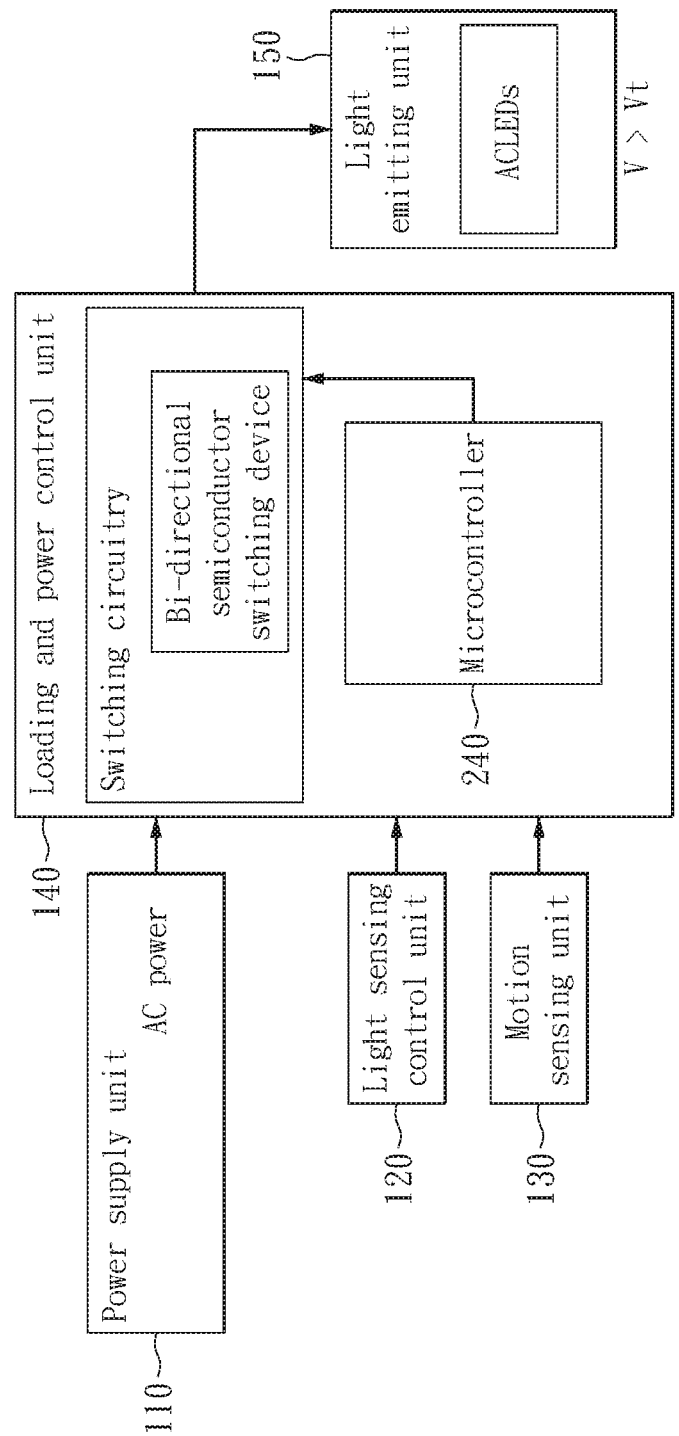
FIG. 1A is an enhanced block diagrammed under FIG. 1 to specifically illustrate an embodiment of FIG. 1 for an ACLED two-level security light, wherein the loading and power comprises a switching circuitry and a microcontroller, wherein the switching circuitry further comprises a bidirectional semiconductor switching device for controlling an average electric power to be delivered to the ACLED.
Figure 1B:
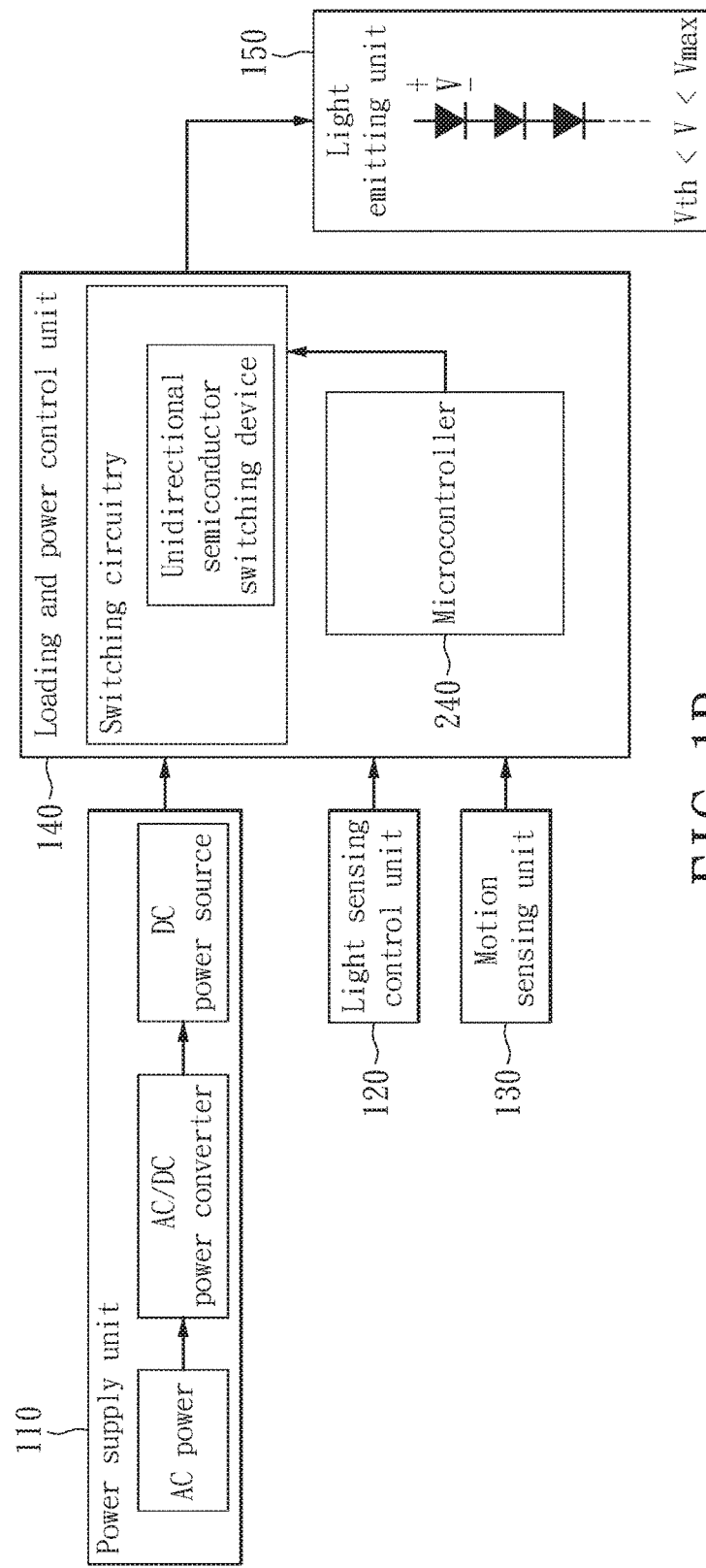
FIG. 1B is an enhanced block diagrammed under FIG. 1 to specifically illustrate an embodiment of FIG. 1 for a DC LED two level security light, wherein the loading and power control unit comprises a switching circuitry and a microcontroller, wherein the switching circuitry further comprises an unidirectional semiconductor switching device for controlling an average electric power to be delivered to the DC LED.

Reference is made in detail to the exemplary embodiments of the present disclosure, examples of which are illustrated in the accompanying drawings. Wherever possible, the same reference numbers are used in the drawings and the description to refer to the same or alike parts.

First Exemplary Embodiment

Refer to FIG. 1, which schematically illustrates a block diagram of a two-level LED security light in accordance to the first exemplary embodiment of the present disclosure. A two-level LED security light (herein as the lighting apparatus) 100 includes a power supply unit 110, a light sensing control unit 120, a motion sensing unit 130, a loading and power control unit 140, and a light-emitting unit 150. The power supply unit 110 is used for supplying power required to operate the system, wherein the associated structure includes the known AC/DC voltage converter. The light sensing control unit 120 may be a photo resistor, which may be coupled to the loading and power control unit 140 for determining daytime or nighttime in accordance to the ambient light. The motion sensing unit 130 may be a passive infrared sensor (PIR), which is coupled to the loading and power control unit 140 and is used to detect intrusions. When a person is entering a predetermined detection zone of the motion sensing unit 130, a sensing signal thereof may be transmitted to the loading and power control unit 140.

The loading and power control unit 140 which is coupled to the light-emitting unit 150 may be implemented by a microcontroller electrically coupled with a switching circuitry electrically connected between the light-emitting unit 150 and the power supply unit 110. The switching circuitry may comprise a plurality of semiconductor switching components. The loading and power control unit 140 may control the illumination levels of the light-emitting unit 150 in accordance to the sensing signal outputted by the light sensing control unit 120 and the motion sensing unit 130. The light-emitting unit 150 may include a plurality of LEDs. The loading and power control unit 140 may control the light-emitting unit 150 to generate at least two levels of illumination variations.

When the light sensing control unit 120 detects that an ambient light is lower than a predetermined value (i.e., nighttime), the loading and power control unit 140 executes the Photo-Control (PC) mode by turning on the light-emitting unit 150 to generate a high level illumination for a predetermined duration then return to a low level illumination for Power-Saving (PS) mode or it may alternatively generate the low level illumination to perform the power saving mode. When the light sensing control unit 120 detects that the ambient light is higher than a predetermined value (i.e., dawn), the loading and power control unit 140 turns off the light-emitting unit 150. In the PS mode, when the motion sensing unit 130 detects a human motion, the loading and power control unit 140 may increase the electric current which flows through the light-emitting unit 150, to generate another high level illumination for a short predetermined duration. After the short predetermined duration, the loading and power control unit 140 may automatically lower the electric current that flow through the light-emitting unit 150 thus have the light-emitting unit 150 return to low level illumination for saving energy.

Refer to 2A, which illustrates a schematic diagram of a two-level LED security light in accordance to the first exemplary embodiment of the present disclosure. The light sensing control unit 120 may be implemented by a light sensor 220; the motion sensing unit 130 may be implemented by a motion sensor 230; the loading and power control unit 140 may be implemented by a microcontroller 240 electrically coupled to a switching circuitry Q1. The light-emitting unit 250 includes three series-connected LEDs L1~L3. The LEDs L1~L3 is connected between a DC source and a transistor Q1, wherein the DC source may be provided by the power supply unit 110. The transistor Q1 may be an N-channel metal-oxide-semiconductor field-effect-transistor (NMOS). The transistor Q1 is connected between the three series-connected LEDs L1~L3 and a ground GND. The loading and power control unit 140 implemented by the microcontroller 240 may output a control signal like a pulse width modulation (PWM) signal to control an average electric current delivered to the light-emitting unit 250. It is worth to note that the electric components depicted in FIG. 2A only serves as an illustration for the exemplary embodiment of the present disclose and hence the present disclosure is not limited thereto.

Figure 2A:
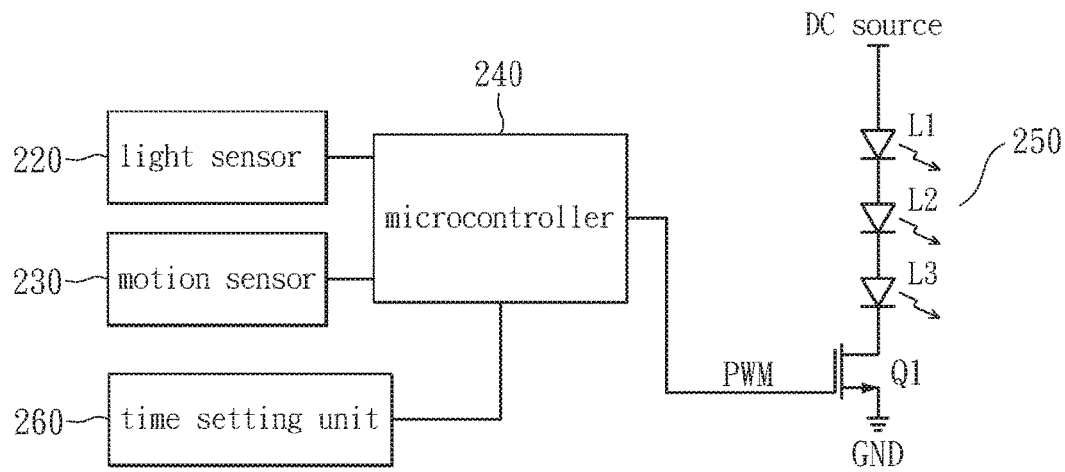
FIG. 2A illustrates a schematic diagram of a two-level LED security light in accordance to the first exemplary embodiment of the present disclosure.
Figure 2B:
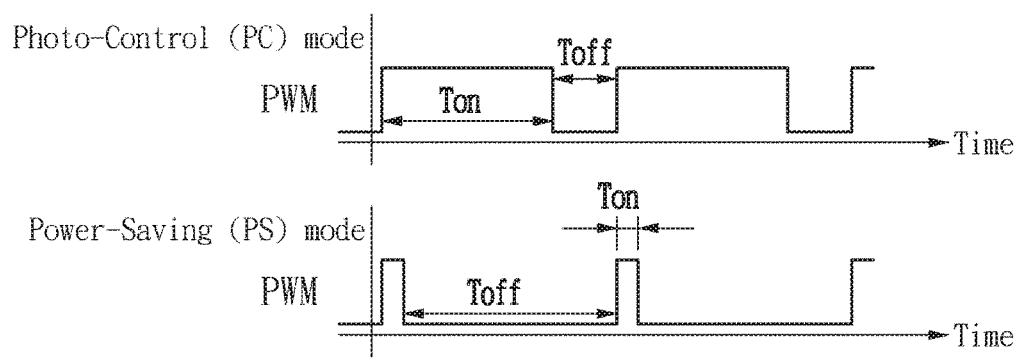
FIG. 2B graphically illustrates a timing waveform of a pulse width modulation (PWM) signal in accordance to the first exemplary embodiment of the present disclosure.

Refer to FIG. 2B concurrently, which graphically illustrates a timing waveform of a pulse width modulation (PWM) signal in accordance to the first exemplary embodiment of the present disclosure. In the PC mode, the PWM signal may be used to configure the transistor Q1 to have the conduction period $T_{on}$ being longer than the cut-off period $T_{off}$. On the other hand in the PS mode, the PWM signal may configure the transistor Q1 to have the conduction period $T_{on}$ being shorter than the cut-off period $T_{off}$. In comparison of the illumination levels between the PC and PS modes, as the conduction period $T_{on}$ of transistor Q1 being longer under the PC mode, therefore have higher average electric current driving the light-emitting unit 250 thereby generate high illumination, which may be classified as the high level illumination; whereas as the conduction period $T_{on}$ of transistor Q1 is shorter in the PS mode, therefore have lower average electric current driving the light-emitting unit 250 thereby generate low illumination, which may be classified as the low level illumination.

The microcontroller 240 turns off the light-emitting unit 250 during the day and activates the PC mode at night by turning on the light-emitting unit 250 to generate the high level illumination for a short predetermined duration then return to the low level illumination thereby entering the PS mode. When the motion sensor 230 detects a human motion in the PS mode, the light-emitting unit 250 may switch to the high level illumination for illumination or warning application. The light-emitting unit 250 may return to the low level illumination after maintaining at the high level illumination for a short predetermined duration to save energy.

In addition, the microcontroller 240 is coupled to a time setting unit 260, wherein the time setting unit 260 may allow a user to configure the predetermined duration associated with the high level illumination in the PC mode, however the present disclosure is not limited thereto. The time setting unit 260 may also be used for setting a predetermined time duration associated with the low level illumination as well as a predetermined time duration associated with a motion activated high level illumination. The time setting unit 260 is typically configured with an analogue circuitry comprising a resister and a capacitor for setting a time length. However, if precision of time length is crucial or much preferred, a digital circuitry may be employed, wherein a voltage divider with a variable resister coupled to the microcontroller designed with a time setting subroutine or a push button device coupled with a grounding pin of the microcontroller designed with the time setting subroutine for more precisely setting a time length for performing an illumination mode.

Second Exemplary Embodiment

Refer again to FIG. 1, wherein the illumination variations of the light-emitting unit 150 may be implemented through the number of light-source loads being turned on to generate more than two levels of illumination. The lighting apparatus 100 in the instant exemplary embodiment may be through turning on a portion of LEDs or all the LEDs to generate a low and a high level of illuminations.

Figure 3A:
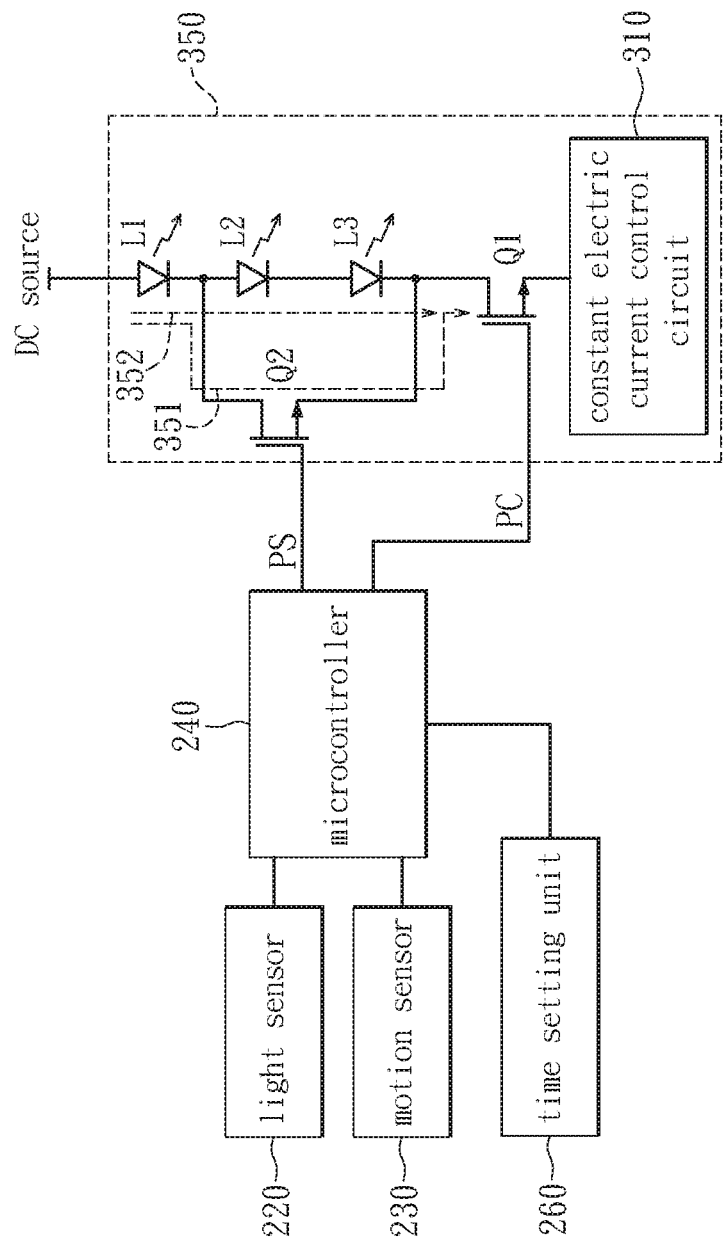
FIG. 3A illustrates a schematic diagram of a two-level LED security light in accordance to the second exemplary embodiment of the present disclosure.

Refer to FIG. 3A concurrently, which illustrates a schematic diagram of a two-level LED security light 100 in accordance to the second exemplary embodiment of the present disclosure. The main difference between FIG. 3A and FIG. 2A is in the light-emitting unit 350, having three series-connected LEDs L1~L3 and NMOS transistors Q1 and Q2. The LEDs L1~L3 are series connected to the transistor Q1 at same time connected between the DC source and a constant electric current control circuit 310. Moreover, transistor Q2 is parallel connected to the two ends associated with LEDs L2 and L3. The gates of the transistors Q1 and Q2 are connected respectively to a pin PC and a pin PS of the microcontroller 240. The constant electric current control circuit 310 in the instant exemplary embodiment maintains the electric current in the activated LED at a constant value, namely, the LEDs L1~L3 are operated in constant-current mode.

Refer to FIG. 3A, the pin PC of the microcontroller 240 controls the switching operations of the transistor Q1; when the voltage level of pin PC being either a high voltage or a low voltage, the transistor Q1 may conduct or cut-off, respectively, to turn the LEDs L1~L3 on or off. The pin PS of the microcontroller 240 controls the switch operations of the transistor Q2, to form two current paths 351 and 352 on the light-emitting unit 350. When the voltage at the pin PS of the microcontroller 240 is high, the transistor Q2 conducts, thereby forming the current path 351 passing through the LED L1 and the transistor Q2; when the voltage at the pin PS being low, the transistor Q2 cuts-off, thereby forming the current path 352 passing through all the LEDs L1~L3. The microcontroller 240 may then control the switching operation of the transistor Q2 to turn on the desired number of LEDs so as to generate a high or a low level illumination.

When light sensor 220 determines that an ambient light is higher than a predetermined value, the microcontroller 240 through the pin PC outputs a low voltage, which causes the transistor Q1 to cut-off and turns off all the LEDs L1~L3 in the light-emitting unit 350. Conversely, when the light sensor 220 detects that the ambient light is lower than the predetermined value, the microcontroller 240 activates the PC mode, i.e., outputting a high voltage from pin PC and a low voltage from pin PS, to activate the transistor Q1 while cut-off the transistor Q2, thereby forming the current path 352, to turn on the three LEDs L1~L3 in the light-emitting unit 350 so as to generate the high level illumination for a predetermined duration. After the predetermined duration, the microcontroller 240 may switch to the PS mode by having the pin PC continue outputting a high voltage and the pin PS outputting a high voltage, to have the transistor Q2 conducts, thereby forming the current path 351. Consequently, only the LED L1 is turned on and the low level illumination is generated.

Figure 3B:
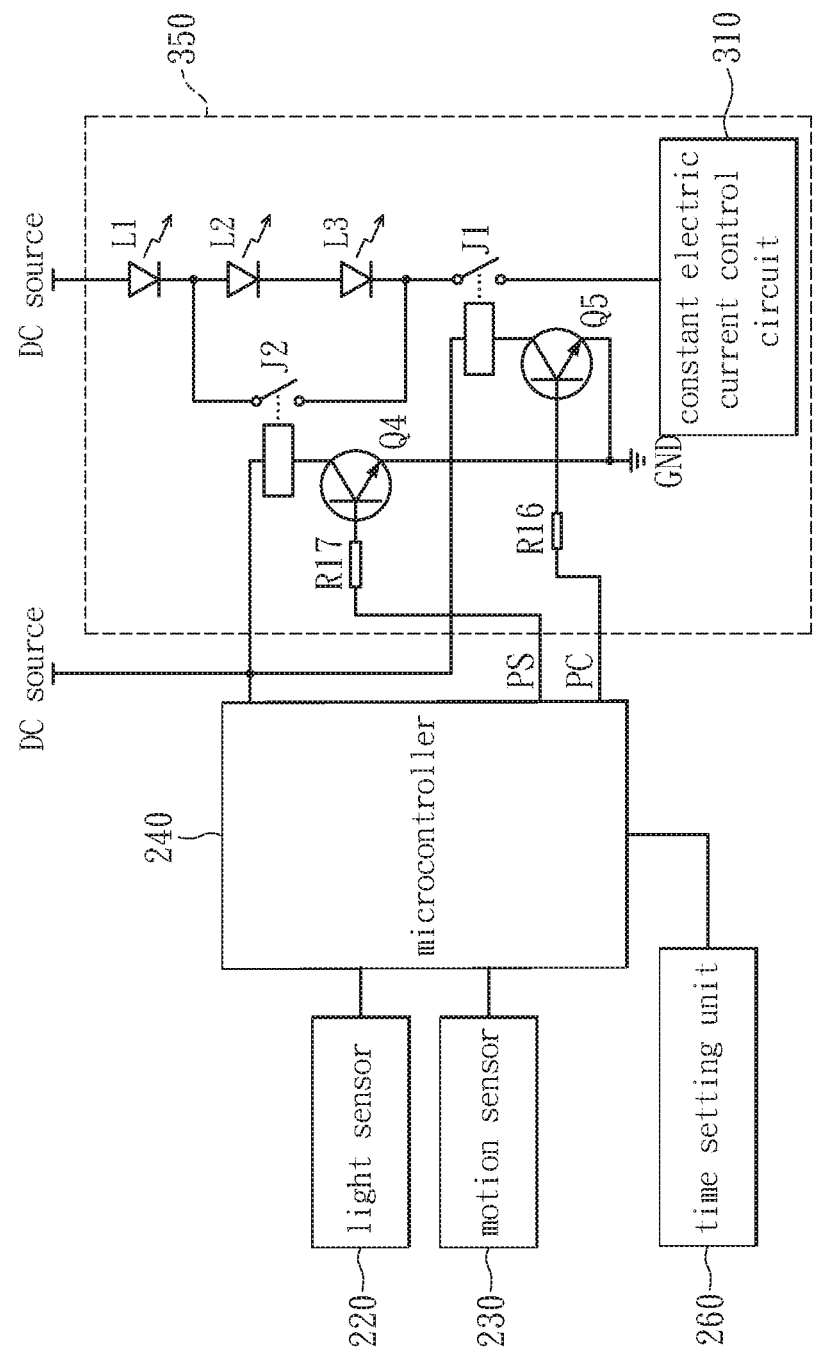
FIG. 3B illustrates a schematic diagram of a two-level LED security light in accordance to the second exemplary embodiment of the present disclosure.

When the motion sensor detects a human motion in the PS mode, the pin PS of the microcontroller 240 temporarily switches from the high voltage to a low voltage, to have the transistor Q2 temporarily cuts-off thus forming the current path 352 to activate all the LEDs in the light-emitting unit 350, thereby temporarily generates the high level illumination. The light-emitting unit 350 is driven by a constant electric current, therefore the illumination level generated thereof is directly proportional to the number of LEDs activated. FIG. 3B illustrates another implementation for FIG. 3A, wherein the relays J1 and J2 are used in place of NMOS transistors to serve as switches. The microcontroller 240 may control the relays J2 and J1 through regulating the switching operations of the NPN bipolar junction transistors Q4 and Q5. Moreover, resistors R16 and R17 are current-limiting resistors.

In the PC mode, the relay J1 being pull-in while the relay J2 bounce off to have constant electric current driving all the LEDs L1~L3 to generate the high level illumination; in PS mode, the relays J1 and J2 both pull-in to have constant electric current only driving the LED L1 thus the low level illumination may be thereby generated. Furthermore, when the motion sensor 230 detects a human motion, the pin PS of the microcontroller 240 may temporarily switch from high voltage to low voltage, forcing the relay J2 to temporarily bounce off and the relay J1 pull-in so as to temporarily generate the high level illumination.

The LED L1 may adopt a LED having color temperature of 2700K while the LEDs L2 and L3 may adopt LEDs having color temperature of 5000K in order to increase the contrast between the high level and the low level illuminations. The number of LEDs included in the light-emitting unit 350 may be more than three, for example five or six LEDs. The transistor Q2 may be relatively parallel to the two ends associated with a plurality of LEDs to adjust the illumination difference between the high and the low illumination levels. Additionally, the light-emitting unit 350 may be connected to a plurality of transistors Q2, which are respectively coupled to the two ends associated with each LED to provide more lighting variation selections. The microcontroller 240 may decide the number of LEDs to turn on in accordance to design needs at different conditions. Based on the explanation of the aforementioned exemplary embodiment, those skills in the art should be able to deduce other implementation and further descriptions are therefore omitted.

Third Exemplary Embodiment

Refer back to FIG. 1, wherein the light-emitting unit 150 may include one or more parallel-connected alternating current (AC) LEDs. A phase controller is coupled between the described one or more parallel-connected ACLEDs and AC power source. The loading and power controller 140 in the instant exemplary embodiment may through the phase controller adjust the average power of the light-emitting unit 150 so as to generate variations in the low level and the high level illuminations.

Figure 4A:
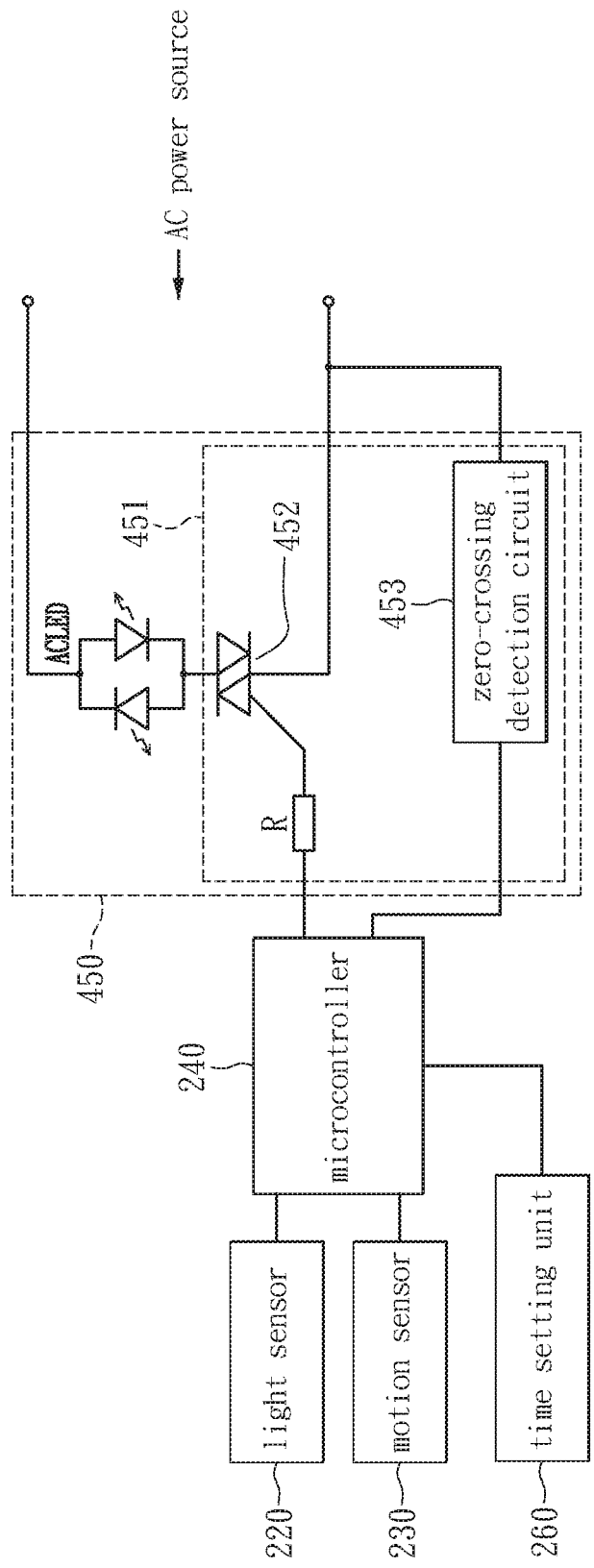
FIG. 4A illustrates a schematic diagram of a two-level LED security light in accordance to the third exemplary embodiment of the present disclosure.

Refer to FIG. 4A, which illustrates a schematic diagram of a two-level LED security light 100 in accordance to the third exemplary embodiment of the present disclosure. The main difference between FIG. 4A and FIG. 3 is in that the light-source load is an ACLED, which is coupled to the AC power source, and further the light-emitting unit 450 is connected to a phase controller 451. The phase controller 451 includes a bi-directional switching device 452, here, a triac, a zero-crossing detection circuit 453, and a resistor R. The microcontroller 240 turns off the light-emitting unit 450 when the light sensor 220 detects that the ambient light is higher than a predetermined value. Conversely, when the light sensor 220 detects that the ambient light is lower than the predetermined value, the microcontroller 240 activates the PC mode by turning on the light-emitting unit 450. In the PC mode, the microcontroller 240 may select a control pin for outputting a pulse signal which through a resistor R triggers the triac 452 to have a large conduction angle. The large conduction angle configures the light-emitting unit 450 to generate a high level illumination for a predetermined duration. Then the microcontroller 240 outputs the pulse signal for PS mode through the same control pin to trigger the triac 452 to have a small conduction angle for switching the light-emitting unit 450 from the high level illumination to the low level illumination of the PS mode. Moreover, when the motion sensor 230 (also called motion sensing unit) detects a human motion in the PS mode, the microcontroller 240 temporarily outputs the PC-mode pulse signal through the same control pin to have the light-emitting unit 450 generated the high level illumination for a short predetermined duration. After the short predetermined duration, the light-emitting unit 450 returns to the low level illumination.

In the illumination control of the ACLED, the microcontroller 240 may utilize the detected zero-crossing time (e.g., the zero-crossing time of an AC voltage waveform) outputted from the zero-crossing detection circuit 453 to send an AC synchronized pulse signal thereof which may trigger the triac 452 of the phase controller 451 thereby to change the average power input to the light-emitting unit 450. As the ACLED has a cut-in voltage $V_t$ for start conducting, thus if the pulse signal inaccurately in time triggers the conduction of the triac 452, then the instantaneous value of AC voltage may be lower than the cut-in voltage $V_t$ of ACLED at the trigger pulse. Consequently, the ACLED may result in the phenomenon of either flashing or not turning on. Therefore, the pulse signal generated by the microcontroller 240 must fall in a proper time gap behind the zero-crossing point associated with the AC sinusoidal voltage waveform.

Supposing an AC power source having a voltage amplitude $V_m$ and frequency f, then the zero-crossing time gap $t_D$ of the trigger pulse outputted by the microcontroller 240 should be limited according to $t_o < t_D < \frac{1}{2}f - t_o$ for a light-source load with a cut-in voltage $V_t$, wherein $t_o = (\frac{1}{2\pi f})\sin^{-1}(V_t/V_m)$. The described criterion is applicable to all types of ACLEDs to assure that the triac 452 can be stably triggered in both positive and negative half cycle of the AC power source. Take ACLED with $V_t$ (rms)=80V as an example, and supposing the $V_m$(rms)=110V and f=60 Hz, then $t_o$=2.2 ms and (½f)=8.3 ms may be obtained. Consequently, the proper zero-crossing time gap $t_D$ associated with the phase modulation pulse outputted by the microcontroller 240 which lagged the AC sinusoidal voltage waveform should be designed in the range of 2.2 ms<$t_D$<6.1 ms.

Figure 4B:
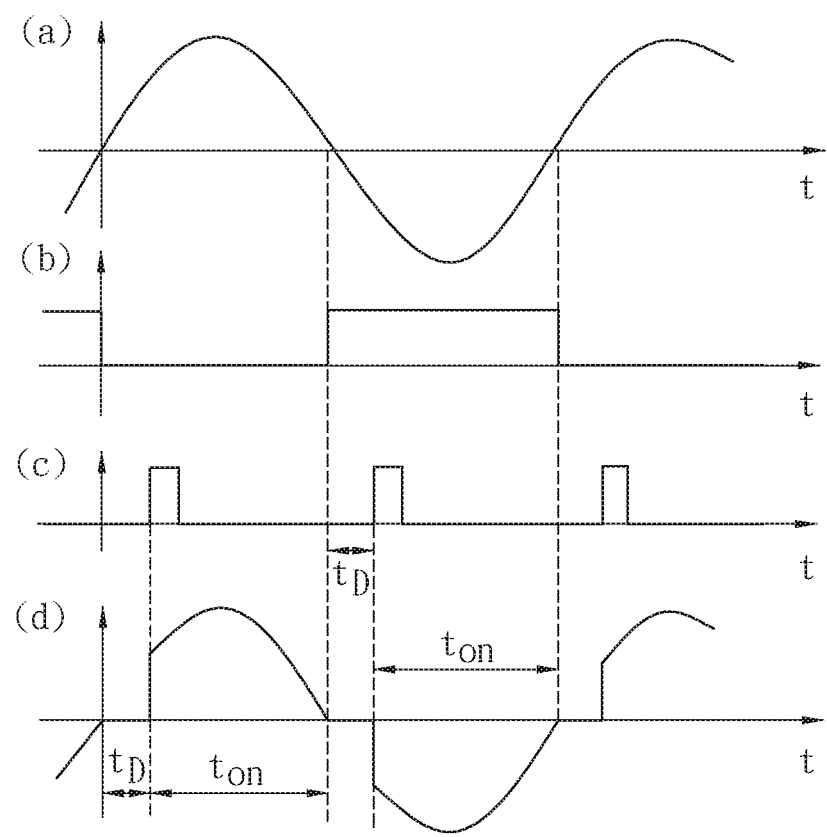
FIG. 4B illustrates a timing waveform of two-level LED security light in accordance to the third exemplary embodiment of the present disclosure.

Refer to FIG. 4B, which illustrates a timing waveform of the two-level LED security light in accordance to the third exemplary embodiment of the present disclosure. Waveforms (a)~(d) of FIG. 4B respectively represent the AC power source, the output of the zero-crossing detection circuit 453, the zero-crossing delay pulse at the control pin of the microcontroller 240, and the voltage waveform across the two ends of the ACLED in the light-emitting unit 450. The zero-crossing detection circuit 453 converts the AC voltage sinusoidal waveform associated with the AC power source to a symmetric square waveform having a low and a high voltage levels as shown in FIG. 4B(b). At the zero-crossing point of the AC voltage sinusoidal wave, the symmetric square waveform may transit either from the low voltage level to the high voltage level or from the high voltage level to the low voltage level. Or equivalently, the edge of the symmetric square waveform in the time domain corresponds to the zero-crossing point of the AC voltage sinusoidal waveform. As shown in FIG. 4B(c), the microcontroller 240 outputs a zero-crossing delay pulse in correspondence to the zero-crossing point of the AC sinusoidal waveform in accordance to the output waveform of the zero-crossing detection circuit 453. The zero-crossing delay pulse is relative to an edge of symmetric square waveform behind a time gap $t_D$ in the time domain. The $t_D$ should fall in a valid range, as described previously, to assure that the triac 452 can be stably triggered thereby to turn on the ACLED. FIG. 4B(d) illustrates a voltage waveform applied across the two ends associated with the ACLED. The illumination level of the light-emitting unit 450 is related to the conduction period $t_{on}$ of the ACLED, or equivalently, the length $t_{on}$ is directly proportional to the average power inputted to the ACLED. The difference between the PC mode and the PS mode being that in the PC mode, the ACLED has longer conduction period, thereby generates the high level illumination; whereas in the PS mode, the ACLED conduction period is shorter, hence generates the low level illumination.

Figure 5:
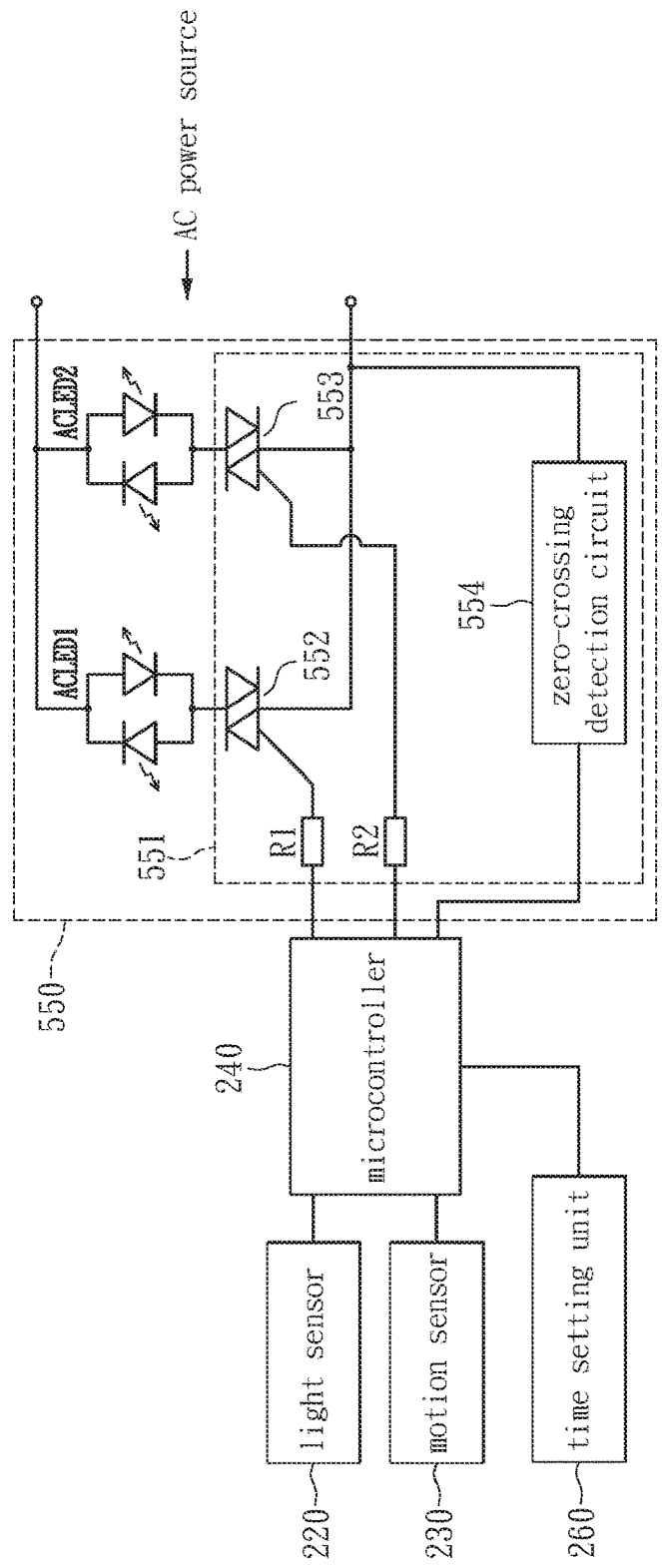
FIG. 5 illustrates a schematic diagram of a two-level LED security light in accordance to the third exemplary embodiment of the present disclosure.

Refer to FIG. 5, which illustrates a schematic diagram of a two-level LED security light 100 in accordance to the third exemplary embodiment of the present disclosure. The light-emitting unit 550 of the lighting apparatus 100 includes an ACLED1, an ACLED2. The phase controller 551 includes triacs 552 and 553, the zero-crossing detection circuit 554 as well as resistors R1 and R2. The light-emitting unit 550 of FIG. 5 is different from the light-emitting unit 450 of FIG. 4 in that the light-emitting unit 550 has more than one ACLED and more than one bi-directional switching device. Furthermore, the color temperatures of the ACLED1 and the ACLED2 may be selected to be different.

In the exemplary embodiment of FIG. 5, the ACLED1 has a high color temperature, and the ACLED2 has a low color temperature. In the PC mode, the microcontroller 240 uses the phase controller 551 to trigger both ACLED1 and ACLED2 to conduct for a long period, thereby to generate the high level illumination as well as illumination of mix color temperature. In the PS mode, the microcontroller 240 uses the phase controller 551 to trigger only the ACLED2 to conduct for a short period, thereby generates the low level illumination as well as illumination of low color temperature. Moreover, in the PS mode, when the motion sensor 230 detects a human motion, the microcontroller 240 may through the phase controller 551 trigger the ACLED1 and ACLED2 to conduct for a long period. Thereby, it may render the light-emitting unit 450 to generate the high level illumination of high color temperature and to produce high contrast in illumination and hue, for a short predetermined duration to warn the intruder. Consequently, the lighting apparatus may generate the high level or the low level illumination of different hue. The rest of operation theories associated with the light-emitting unit 550 are essentially the same as the light-emitting unit 450 and further descriptions are therefore omitted.

Fourth Exemplary Embodiment

Figure 6:
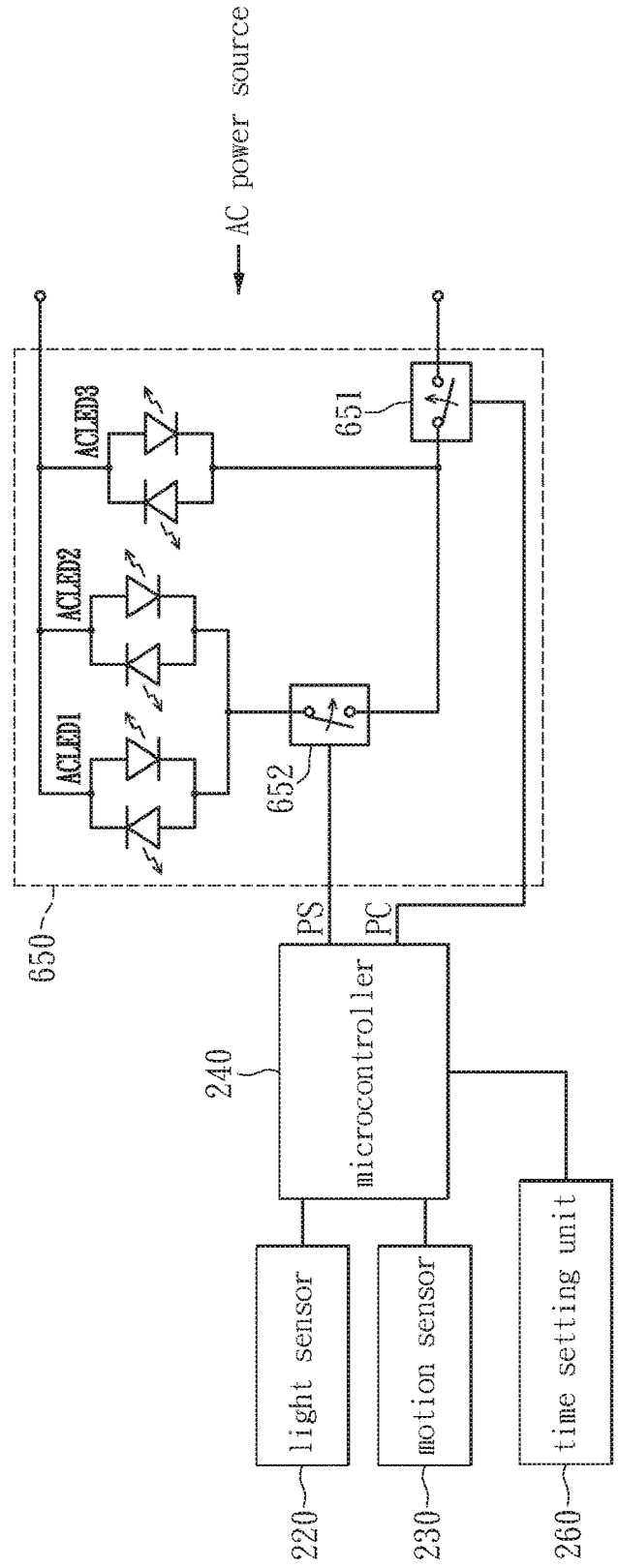
FIG. 6 illustrates a schematic diagram of a two-level LED security light in accordance to the fourth exemplary embodiment of the present disclosure.

Refer to FIG. 6, which illustrates a schematic diagram of a two-level LED security light 100 in accordance to the fourth exemplary embodiment of the present disclosure. The light-emitting unit 150 of FIG. 1 may be implemented by the light-emitting unit 650, wherein the light-emitting unit 650 includes three ACLED1~3 having identical luminous power electrically connected to switches 651 and 652. In which, switches 651 and 652 may be relays. The parallel-connected ACLED1 and ACLED2 are series-connected to the switch 652 to produce double luminous power, and of which the ACLED3 is parallel connected to, to generate triple luminous power, and of which an AC power source is further coupled to through the switch 651. Moreover, the microcontroller 240 implements the loading and power control unit 140 of FIG. 1. The pin PC and pin PS are respectively connected to switches 651 and 652 for outputting voltage signals to control the operations of switches 651 and 652 (i.e., open or close).

In the PC mode, the pin PC and pin PS of the microcontroller 240 control the switches 651 and 652 to be closed at same time. Consequently, the ACLED1~3 are coupled to the AC power source and the light-emitting unit 650 may generate a high level illumination of triple luminous power. After a short predetermined duration, the microcontroller 240 returns to PS mode. In which the switch 651 is closed while the pin PS controls the switch 652 to be opened, consequently, only the ACLED3 is connected to AC power source, and the light-emitting unit 650 may thus generate the low level illumination of one luminous power. In the PS mode, when the motion sensor 230 detects a human motion, the microcontroller 240 temporarily closes the switch 652 to generate high level illumination with triple luminous power for a predetermined duration. After the predetermined duration, the switch 652 returns to open status thereby to generate the low level illumination of one luminous power. The lighting apparatus of FIG. 6 may therefore through controlling switches 651 and 652 generate two level illuminations with illumination contrast of at least 3 to 1.

The ACLED1 and ACLED2 of FIG. 6 may be high power lighting sources having color temperature of 5000K. The ACLED3 may be a low power lighting source having color temperature of 2700K. Consequently, the ACLED may generate two levels of illuminations with high illumination and hue contrast without using a zero-crossing detection circuit.

Fifth Exemplary Embodiment

Figure 7:
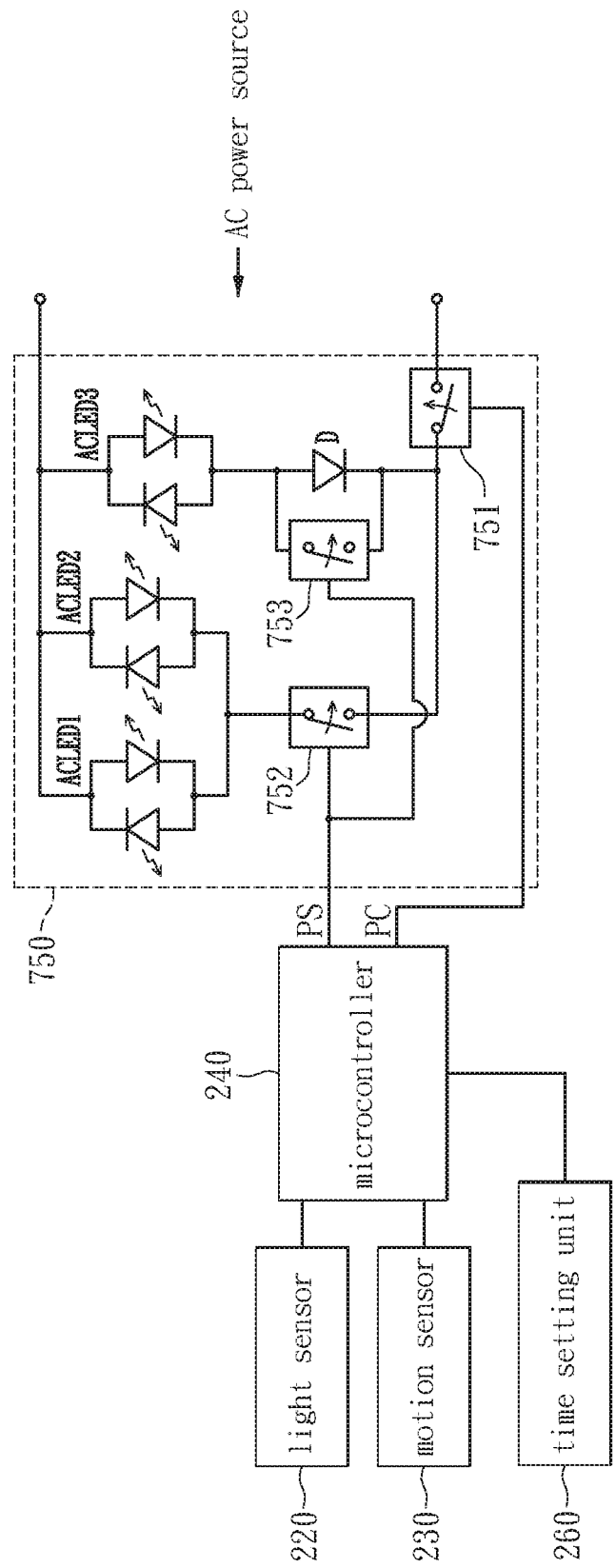
FIG. 7 illustrates a schematic diagram of a two-level LED security light in accordance to the fifth exemplary embodiment of the present disclosure.
Figure 8A:
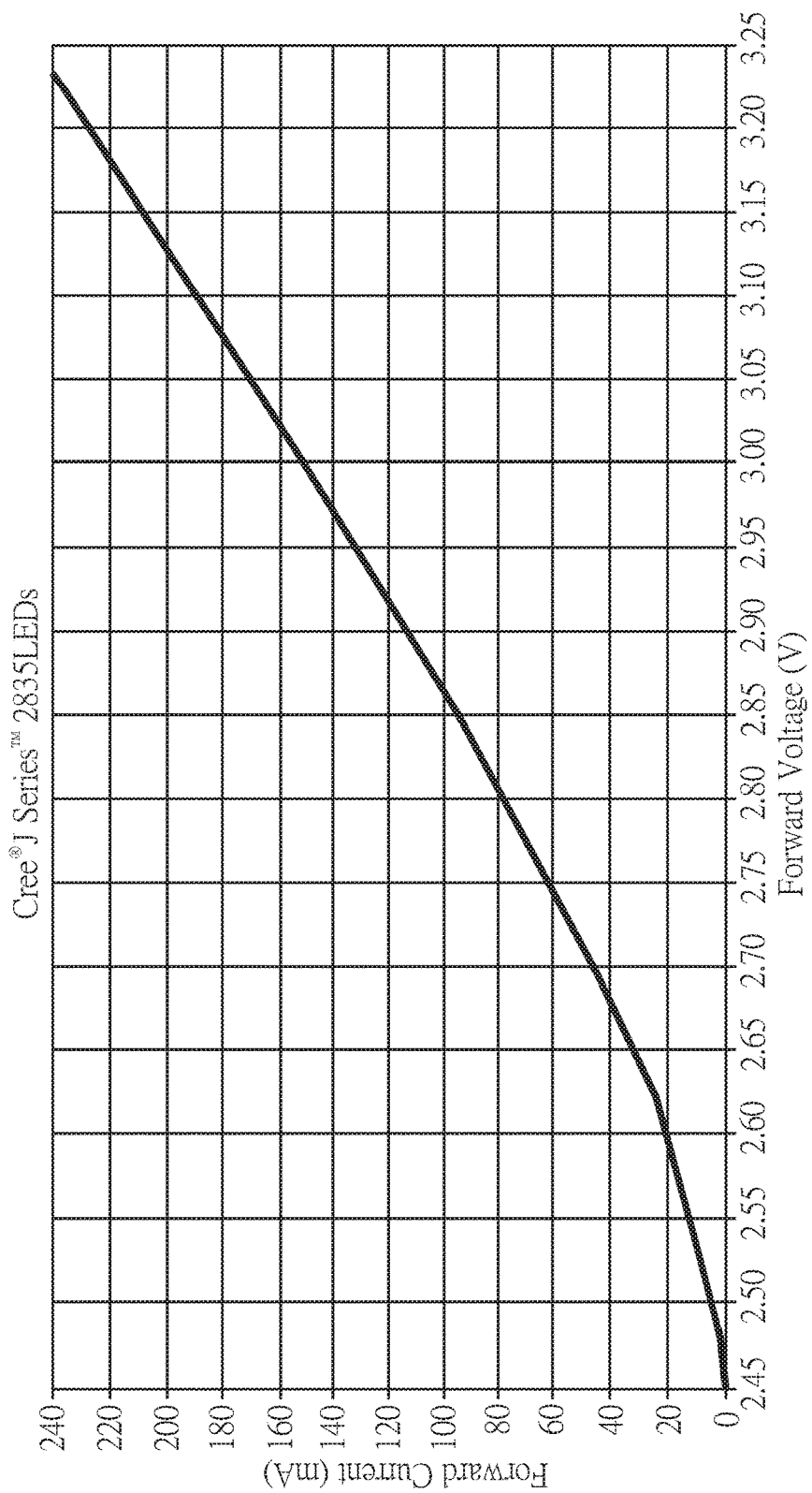
FIGS. 8A, 8B, 8C and 8D schematically and respectively show V-I relationship charts (Forward Current vs. Forward Voltage) for a white LED chip from each of 4 different LED manufacturers.
Figure 8B:
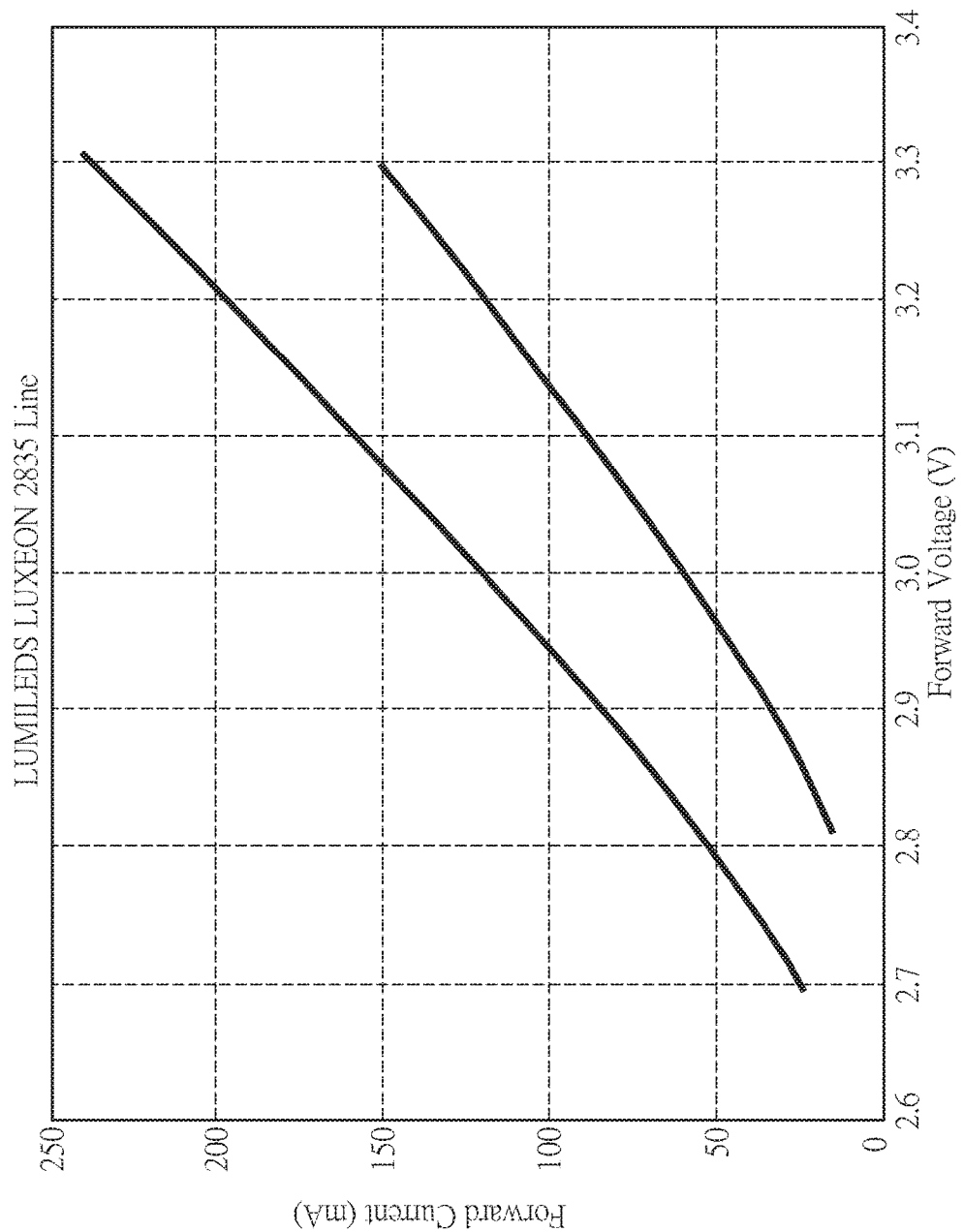
Figure 8C:
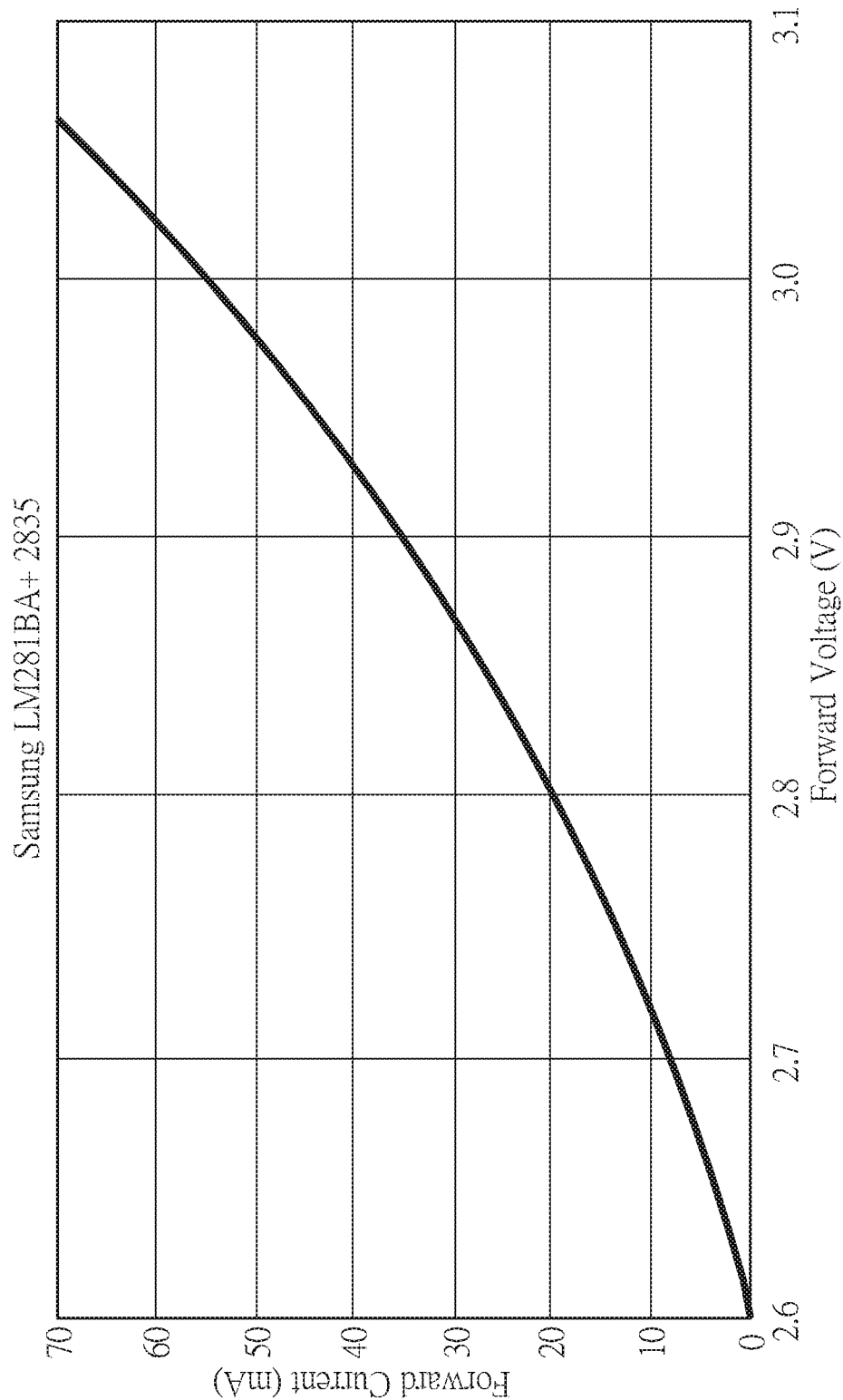
Figure 8D:
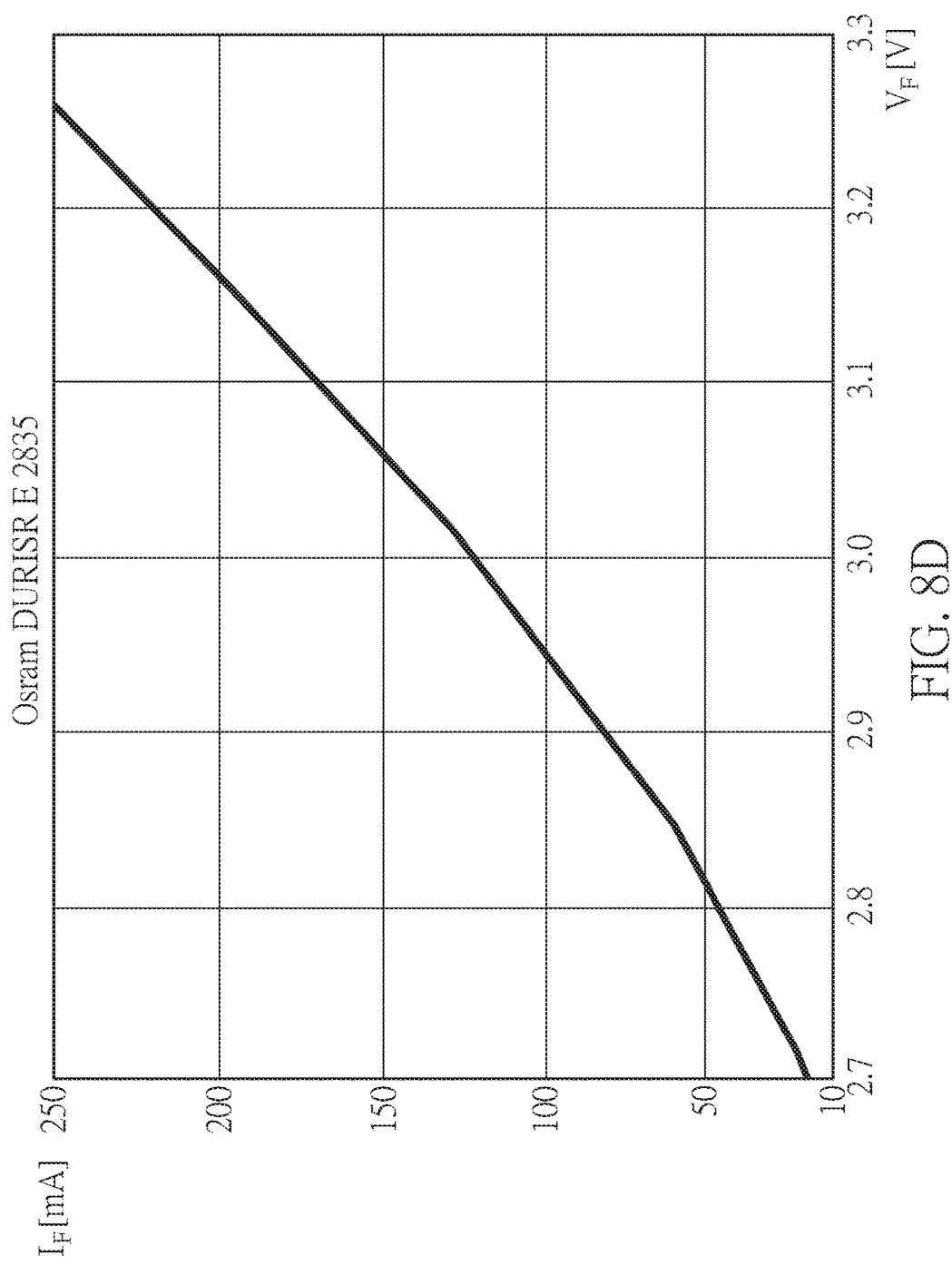

Refer to FIG. 7, which illustrates a schematic diagram of a two-level LED security light in accordance to the fifth exemplary embodiment of the present disclosure. The light-emitting unit 750 of FIG. 7 is different from the light-emitting unit 640 of FIG. 6 in that the ACLED3 is series-connected to a circuit with a rectified diode D and a switch 753 parallel-connected together, and of which is further coupled through a switch 751 to AC power source. When the switch 753 closes, the AC electric current that passes through the ACLED3 may be a full sinusoidal waveform. When the switch 753 opens, the rectified diode rectifies the AC power, thus only one half cycle of the AC electric current may pass through the ACLED, consequently the luminous power of ALCED3 is cut to be half.

The pin PS of the microcontroller 240 synchronously controls the operations of switches 752 and 753. If the three ACLED1~3 have identical luminous power, then in the PC mode, the pin PC and pin PS of the microcontroller 240 synchronously close the switches 751~753 to render ACLED1~3 illuminating, thus the light-emitting unit 750 generates a high level illumination which is three-times higher than the luminous power of a single ACLED. When in the PS mode, the microcontroller 240 closes the switch 751 while opens switches 752 and 753. At this moment, only the ACLED3 illuminates and as the AC power source is rectified by the rectified diode D, thus the luminous power of ACLED3 is half of the AC power source prior to the rectification. The luminous power ratio between the high level and the low level illuminations is therefore 6 to 1. Consequently, strong illumination contrast may be generated to effectively warn the intruder.

It should be noted that the light-emitting unit in the fifth exemplary embodiment is not limited to utilizing ACLEDs. In other words, the light-emitting unit may include any AC lighting sources such as ACLEDs, incandescent lamps, or fluorescent lamps.

When the light source of the light-emitting unit 150 is confined to the use of an LED load, the compliance and satisfaction of an operating constraint attributable to the unique electrical characteristics of the LED load is vital to a successful performance of an LED lighting device. Any LED lighting device failing to comply with the operating constraint of the unique electrical characteristics is bound to become a trouble art. This is because the LED as a kind of solid state light source has completely different electrical characteristics for performing light emission compared with conventional light source such as incandescent bulbs or fluorescent bulbs. For instance, for a white light or blue light LED there exists a very narrow voltage domain ranging from a minimum threshold voltage at 2.5 volts to a maximum working voltage at 3.3 volts, which allows to operate adequately and safely the LED; in other words, when a forward voltage imposed on the LED is lower than the minimum threshold voltage, the LED is not conducted and therefore no light is emitted, when the forward voltage exceeds the maximum working voltage, the heat generated by a forward current could start damaging the construction of the LED. Therefore, the forward voltage imposed on the LED is required to operate between the minimum threshold voltage and the maximum working voltage. In respect to the LED load of the light-emitting unit 150, the cut-in voltage $V_t$ of ACLEDs is technically also referred to as a minimum threshold voltage attributable to PN junctions manufactured in LEDs. More specifically, the LED is made with a PN junction semiconductor structure inherently featured with three unique electrical characteristics, the first characteristic is one-way electric conduction through the PN junction fabricated in the LED, the second electrical characteristic is a minimum threshold voltage $V_{th}$ required to trigger the LED to start emitting light and the third electrical characteristic is a maximum working voltage $V_{max}$ allowed to impose on the LED to avoid a thermal runaway to damage or burn out the semiconductor construction of the LED. The described cut-in voltage $V_t$ has the same meaning as the above mentioned minimum threshold voltage $V_{th}$ which is a more general term to be used for describing the second electrical characteristic of a PN junction semiconductor structure. Also because the cut-in voltage $V_t$ is specifically tied to forming a formula to transform the minimum threshold voltage into a corresponding time phase of AC power for lighting control, it is necessary to use the term $V_{th}$ as a neutral word for describing the LED electrical characteristics to avoid being confused with the specific application for ACLED alone. Additionally, it is to be clarified that the term $V_m$ is related to the amplitude of the instant maximum voltage of an AC power source which has nothing to do with the third electrical characteristic $V_{max}$ of an LED load.

An LED chip is a small piece of semiconductor material with at least one LED manufactured inside the semiconductor material. A plurality of LEDs may be manufactured and packaged inside an LED chip for different levels of wattage specification to meet different illumination need. For each LED chip designed with a different level of wattage specification there always exists a narrow voltage domain $V_{th}<V<V_{max}$, wherein $V_{th}$ is the minimum threshold voltage to enable the LED chip to start emitting light and $V_{max}$ is the maximum working voltage allowed to impose on the LED chip to protect the LED chip from being damaged or burned out by the heat generated by a higher working voltage exceeding $V_{max}$.

For an LED load configured with a plurality of the LED chips in any LED lighting device, regardless such LED load being configured with ACLED chips or DC LED chips, the working voltage of each single LED chip is required to operate in a domain between a minimum threshold voltage $V_{th}$ and a maximum working voltage $V_{max}$ or $V_{th}<V<V_{max}$ and the working voltage of the LED load comprising N pieces of LED chips connected in series is therefore required to operate in a domain established by a minimum threshold voltage $N \times V_{th}$ and a maximum working voltage $N \times V_{max}$ or $N \times V_{th}<V<N \times V_{max}$, wherein N is the number of the LED chips electrically connected in series. For any LED lighting device comprising an LED load it is required that the LED load in conjunction with an adequate level of power source is configured with a combination of in series and in parallel connections of LED chips such that the electric current passing through each LED chip of the LED load remains at an adequate level such that a voltage V across each LED chip complies with an operating constraint of $V_{th}<V<V_{max}$ featuring electrical characteristics of the LED chip or a voltage V across the LED load configured with N number of LED chips connected in series complies with an operating constraint of $N \times V_{th}<V<N \times V_{max}$. Such narrow operating range therefore posts an engineering challenge for a circuit designer to successfully design an adequate level of power source and a reliable circuitry configured with an adequate combination of in series connection and in parallel connection of LED chips for operating a higher power LED security light.

FIGS. 8A, 8B, 8C and 8D comprises 4 drawings schematically and respectively showing a V-I relationship chart (Forward Current vs. Forward Voltage) for a white light LED chip from each of 4 different LED manufacturers; as can be seen from the chart when a forward voltage V is below a minimum forward voltage at around 2.5 volts, the LED chip is not conducted so the current I is zero, as the forward voltage exceeds 2.5 volts the LED chip is activated to generate a current flow to emit light, as the forward voltage continues to increase, the current I increases exponentially at a much faster pace, at a maximum forward voltage around 3.3 volts the current I becomes 250 mA which generates a heat that could start damaging the PN junction of the LED chip. The minimum forward voltage (the minimum threshold voltage or cut-in voltage) and the maximum forward voltage are readily available in the specification sheets at each of LED manufacturers, such as Cree, Lumileds, Samsung, Osram, and etc. Different LED manufacturers may have slightly different figures due to manufacturing process but the deviations of differences are negligible. The constraints of minimum forward voltage and maximum forward voltage represent physical properties inherent in any solid state light source. They are necessary matter for configuring any LED lighting products to ensure a normal performance of an LED load.

FIG. 9 is a data sheet showing data of the minimum forward voltages and maximum forward voltages collected from various LED manufacturers. They are fundamental requirements for configuring any LED lighting control devices to ensure a successful performance of any LED lighting device.

In summary, the compliance of voltage operating constraint $V_{th}<V<V_{max}$ featuring electrical characteristics of an LED chip is a critical technology for ensuring a normal performance of the LED load. Failing to comply with such voltage operating constraint can quickly age or seriously damage the semiconductor structure of the LED chip with a consequence of quick lumens depreciation of the LED bulbs and the product lifetime being substantially shortened, which will be unacceptable to the consumers.

The compliance of the operating constraint $V_{th}<V<V_{max}$ is a necessary matter for any LED lighting device though it is not an obvious matter as it requires complicated technologies to calculate and coordinate among an adequate level of power source, a control circuitry and a non-linear light emitting load. For conventional lighting load such as incandescent bulb there exists no such operating constraint. This is why in the past years there had been many consumers complaining about malfunction of LED bulbs that the consumers were frustrated with the fast depreciation of lumens output and substantially shortened product lifetime of the LED bulbs purchased and used. A good example was a law suit case filed by the Federal Trade Commission on Sep. 7, 2010 (Case No. SACV10-01333 JVS) for a complaint against a leading lighting manufacturer (Light of America) for marketing deceptive LED lamps and making false claims with respect to the life time of their LED lamps and a huge amount of monetary relief was claimed with the Court in the complaint.

The present disclosure of a lifestyle security light provides a unique lifestyle lighting solution. The motivation of creating such lifestyle lighting solution has less to do with the energy saving aspect of the low level illumination mode because LED is already a very energy saving light source compared with the conventional incandescent light source. For instance, a 10-watt LED security light when operated at a low level at 30% illumination it only saves 7 watts, which is not as significant as a 100-watt incandescent bulb which can save as much as 70 watts when operated at 30% illumination for a low level mode. While it is always good to save some extra energy, it is however not the main incentives for developing the present invention; the lifestyle lighting solution of the present disclosure is featured with at least three innovative advantages which meaningfully improve the exquisite tastes of living in the evening, the first innovative advantage is the creation of an aesthetic scene for the outdoor living environment, wherein at dusk the LED security light is automatically turned on by the photo sensor to perform the low level illumination which is necessary for creating a soft and aesthetic night scene for the outdoor living area, such soft and aesthetic night scene is not achievable by the high level illumination, the second innovative advantage is the creation of a navigation capacity similar to a light house effect for guiding people to safely move toward a destination in the outdoor living area without getting lost or encountering an accident, the third innovative advantage is a prevention of the light being unexpectedly and completely shutoff while a person is still in the detection area and a simple motion can bring the light back to the full illumination. These three innovative functions coupled with the motion sensor to increase illumination when people enters into the short detection area makes the present invention a perfect lifestyle lighting solution for enjoying an exquisite taste of evening life.

A lighting apparatus may be implemented by integrating a plurality of LEDs with a microcontroller and various types of sensor components in the controlling circuit in accordance to the above described five exemplary embodiments. This lighting apparatus may automatically generate high level illumination when the ambient light detected is insufficient and time-switch to the low level illumination. In addition, when a person is entering the predetermined detection zone, the lighting apparatus may switch from the low level illumination to the high level illumination, to provide the person with sufficient illumination or to generate strong illumination and hue contrast for monitoring the intruder.

The following supplements are written to present new technologies additionally developed for improving the performance of a conventional motion sensing security which uses a manual timer setting for operating a motion activated security light.

The supplemental disclosure discloses an artificial intelligence (A.I.) based motion sensing security light capable of using a machine learning technique to learn users' motion characteristics in a detection space and thereby to draw an inference for an optimal value of a delay timer for operating the motion sensing security light triggered by a motion intrusion detected by a motion sensor on an automatic basis. The supplemental disclosure also discloses new technologies to make the motion sensing security light more user friendly in serving both a pathway illumination need and occupancy illumination need.

Conventional motion sensing security light uses a manual adjustment switch operable by a user to set a timer from a plurality of timers for operating a light-on duration triggered by a motion sensor. Hence a security light is automatically turned on generating a full power illumination when a motion intrusion is detected in a detection space and is turned off when the timer runs out a preset time length. A turn-off operation is then delayed for the preset time length which is a preset delay time controlled by the timer to determine the light-on duration. Such manually adjusted timer may be roughly selected by a user when the security light is initially installed and often it may cumbersomely require many re-settings of the timer until the preset delay time can essentially meet the user's expectation or the user may just select a much longer delay time to cover all illumination needs at cost of energy waste. There is therefore a motivation for inventing an automatic timer which can automatically determine a delay time adequately for a user based on a learning experience and inference of users' motion characteristics in a living space where the security light is installed.

A security light of the aforementioned art has a drawback. At a moment when the light-on duration determined by the preset delay time of the timer expires with no more motion detected the light is suddenly and completely switched off. Such sudden switch-off without pre-warning often causes inconvenience or uncomfortable hardship to a user remaining in the detection space due to the preset delay time usually being too short. There is a motivation for coming out a solution to relieve the user from the hardship of an unexpected shutoff of light. When an illumination is needed the light should be turned on immediately, while when the illumination is no longer needed the light can be turned off with an arrangement of delay shutoff. The delay shutoff may be configured with a two-step shutoff process to help resolve the hardship of unexpected shutoff, wherein for the first step of the two-step shutoff process the illumination is instantly dropped to a partial level of the full power illumination for a first short time period followed by a second step to gradually shutoff the illumination over a second short time period; the first step is used for delivering a message signal to the occupant remaining in the detection space that the light will be shutoff shortly, the occupant upon receiving the message signal may responsively act a simple motion detectable by the motion sensor to stop the delay shutoff, a controller thereby operates to instantly resume the full power illumination continuing for the light-on duration controlled by the timer and subsequently restart a new delay shutoff such that the hardship of unexpected shutoff can be avoided.

The security light is currently used for two applications. The first application is for providing a pathway illumination need for non-stop walking along a path way. The second application is for providing the need of occupancy illumination. For the first application the light-on duration setting of the timer can be a short time length of only a few seconds because the motion sensor will continue to receive motion signals to renew the delay time till the occupant leaves the detection space and then the timer will run a final cycle of a selected timer before it operates to turn off the security light. For the second application used for occupancy illumination the light-on duration controlled by the timer needs to be long enough so that the light will not be turned off when an occupant is staying temporarily in the detection space. The security light with a manual time setting unit traditionally comprises at least a short timer (e.g., 1 minute), a medium timer (e.g., 5 minutes) and a long timer (e.g., 10 minutes) for selection by a user to control the light-on duration triggered by the motion sensor; wherein when the short timer is selected by the user, the security light operates with a light-on duration of 1 minute each time when a new motion signal is detected, the short timer might be a good solution for the pathway illumination need though it could be made much shorter but it is not a satisfactory solution for the occupancy illumination need because if the occupant remains motionless for longer than 1 minute the timer will expire and the security light will be turned off; wherein when a medium timer is selected by the user, the security light operates for instance a light-on duration of 5 minutes each time when a new motion signal is detected, the medium timer is a compromised solution between operating the pathway illumination need and the occupancy illumination need; wherein when a long timer is selected by the user, the security light operates a light-on duration of 10 minutes or longer each time when a new motion signal is detected, the long timer is a good solution for the occupancy illumination need but not for the pathway illumination need because the security light will continues for another cycle of the long light-on duration even after the occupant leaves the detection space. None of these three manual timers provides an ideal solution to consumers who appreciate a more user friendly security light which can work more efficiently between serving the pathway illumination need and serving the occupancy illumination need at any time. There is a motivation for inventing a more user friendly security light which allows a user to remotely manage timer switching on the spot with a simple motion whenever a longer light-on duration is needed during a delay shutoff process. This way the security light can more efficiently serve both the pathway illumination need and the occupancy illumination need without suffering the hardship of unexpected shutoff.

There is a motivation to come out a motion sensor combining a smart timer which can automatically determine whether the security light is for a pathway need or for an occupancy illumination need and accordingly uses an algorithm to find an adequate delay timer for operating the security light. Such automatic setting of delay timer coupled with the above described two-step delay shutoff technology makes the supplemental disclosure an ideal product for home security lighting solution.

The supplemental disclosure discloses three technologies for creating an A.I. (artificial intelligence) based motion sensing security light, wherein no manual timer setting is required for operating a motion sensing security light, the motion sensing security light is turned on to generate a light when a motion signal is detected and the light continuing for a time period or a delay time controlled by a timer is automatically turned off when a detection space is unoccupied.

In the first technology a shutoff transition mode is disclosed to avoid a hardship or an inconvenience caused by an unexpected shutoff of light upon a maturity of the timer preselected, the shutoff transition mode designed to turn off the light is configured with a two-step shutoff process, wherein during a first step shutoff process, the illumination is instantly dropped to a noticeably lower level for a first short time period followed by a second step shutoff process to gradually shutoff the illumination over a second short time period. The first step shutoff process is used for delivering a message to an occupant remaining in the detection space that the light will be shutoff shortly, the occupant upon receiving the message may responsively act to generate an interruption motion signal detectable by a motion sensor to stop performing the shutoff transition mode, a controller thereby operates to instantly resume the illumination for the time period or the delay time of the timer and subsequently to restart performing a new cycle of the shutoff transition mode for turning off the light such that the hardship of unexpected shutoff can be avoided.

The second technology is an enhancement of the first technology built on the framework of the shutoff transition mode, wherein whenever an interruption motion signal is detected by the motion sensor in the shutoff transition mode, the controller manages to veto a decision for turning off the light and to bring the light back to a prior state, at the same time the controller operates to renew the timer with a new predetermined delay time longer than the former predetermined delay time according to a timer escalation algorithm. The timer escalation algorithm enables a user to remotely lengthen the delay time of the timer on the spot with a simple interruption motion during the shutoff transition mode for changing to a timer renewed with a longer delay time to operate the light-on duration triggered by the motion sensor; with such arrangement the motion sensing security light becomes a user friendly device which can efficiently serve both a pathway illumination need and an occupancy illumination need. It is therefore feasible to program the timer with two types of time duration including a short time duration (e.g., 30 seconds or shorter) for operating a pathway illumination and a long time duration (e.g., 20 minutes or longer) for operating a temporary occupancy illumination. When the motion sensing security light is designed with a dual-function of being able to serve either a pathway illumination need or a temporary occupancy illumination need, additional technology may be provided to avoid an energy waste for performing a final cycle of the timer after an occupant leaves the living space; this will require a change of performance mode from a motion sensing mode for providing the pathway illumination to a timer control mode for providing the occupancy illumination, wherein at the time when an interruption motion signal is detected during the shutoff transition mode, the controller manages to switch the performance mode from the motion sensing mode to the timer control mode with the motion sensor temporarily deactivated till the timer expires, wherein upon the maturity of the timer with a long delay time set for providing the occupancy illumination, the controller manages to synchronously reactivate the motion sensor to perform the motion sensing mode during the short time period of the shutoff transition mode. With such arrangement the light will not perform the final cycle of the timer after the occupant leaves the living space and the light is automatically turned off when the timer for performing the timer control mode expires.

Further, the timer escalation algorithm activated by an interruption motion signal in the shutoff transition mode can be repeatedly performed till a maximum motionless duration featuring user's motion characteristics is surpassed. The delay time of timer being escalated automatically to first surpass the maximum motionless duration is an ultimate value which enables the light to remain on whenever the occupant stays in the detection space. When a person enters a detection space, the person will continuously generates series of motion signals till the person has finally left the living space, and between any two consecutive motion signals there exists a motionless moment or a motionless duration, although such motionless duration may vary limitedly from motion to motion and from person to person during the period that a person continuously stays in the living space, it generally has a confined pattern of motionless durations featuring the purpose that the living space is used for and among the pattern of motionless durations occurred there always exists a maximum motionless duration which can be searched and approached for being used as a reference for setting an ultimate value required for operating an automatic timer. When the timer escalation algorithm is continuously operated to automatically increase the delay time of timer along the occurrence sequence of interruption motion signals it will eventually reach the ultimate value of the delay time of timer wherein upon a maturity of the timer with the ultimate value no more interruption motion signal is detected in the shutoff transition mode indicating the detection space is unoccupied and the light is therefore successfully turned off. The ultimate value of the delay time of timer so searched and derived represents the timer being just long enough to cover the maximum motionless duration therefore the light will not be turned off as long as the person remains in the detection space because a motion will surely occur at or right after expiration of the maximum motionless duration and such motion will trigger to restart time counting of the timer, wherein if no motion is detected upon the maturity of the timer after running out the ultimate value being set automatically which indicates the detection space is unoccupied, the light will then be turned off.

The third technology is configured with two processes for automatically setting a timer which can effectively manage an on/off performance of the light according to an occupancy status of the living space, wherein a first process is operated by a machine learning software designed to search for a maximum motionless duration in each motion intrusion event using the timer escalation algorithm of the above second technology to repeatedly renew and increase the value of timer till reaching the ultimate value which is just long enough to cover the maximum motionless duration for an occupant staying in the living space such that the light will not be turned off so long as the occupant remains in the detection space and the light will only be turned off when the timer with the ultimate value successfully expires. The ultimate value of timer so derived is recorded as one sample of the ultimate value, the machine learning software continues to search for more ultimate values of the delay time for a sufficient M number of motion intrusion events after the motion sensing security light being installed in a detection space to build a statistical data base to be used for further analysis in the second process, wherein a second process is operated by an inference software designed to analyze the distribution characteristics of the data base of the ultimate values collected from operating the machine learning software and determine an adequate delay time value of timer representing motion characteristics in the detection space for operating the light-on duration triggered by a motion signal; wherein if the statistics of the collected ultimate values features a narrow distribution centered around a low mean value of time length (e.g., 20 seconds of shorter), the detection space is identified as a pathway space and the motion sensing security light is installed for providing a pathway illumination need; wherein if the statistics of the collected ultimate values features a narrow distribution centered around a high mean value of time length (e.g., two minutes or more), the detection space is a temporary occupancy space and the motion sensing security light is installed for providing a temporary occupancy illumination need; wherein if the statistics of the collected ultimate values features the collected ultimate values are distinctly dividable into two groups of ultimate values with a first group of ultimate values centered around a low mean value and a second group of ultimate values centered around a high mean value, it indicates the security serves both the pathway illumination need and the occupancy illumination need.

With such configuration the security light is able to perform a lighting control according to an occupancy status of an installed living space based on an inference drawn on a data base of motion characteristics. Additionally a further integration with the first or second technology ensures the security light able to manage special situation wherein the motionless duration is longer than the ultimate value of the automatic timer. When the security light is turned off the timer value is reset to the automatic timer for operating the next motion intrusion event.

To sum up, the supplemental disclosure is aimed at replacing the cumbersome yet inefficient manual timer of the conventional motion sensing security light with an automatic timer to make the motion sensing security light a much more user friendly automatic illumination device capable of serving both a pathway illumination need characterized with a short operating timer and an occupancy illumination need characterized with a long operating timer. The inability to efficiently serve both the pathway illumination need and the occupancy illumination need has been a major drawback of the conventional motion sensing security light configured with a manual adjustment timer; an automatic timer with switching capacity between serving the pathway illumination need and serving the occupancy illumination need is made possible by the technologies disclosed in the supplemental disclosure.

The supplemental disclosure discloses a security light based on A.I. technology employing three technologies to implement an automatic illumination control. The security light has a structure including at least a light emitting unit, a sensing control unit, a time setting unit and a controller. The light emitting unit may be configured with LED (light emitting diode) light loads. The sensing control unit may be configured by a motion sensor and a photo sensor respectively for operating motion sensing control and day light sensing control. The time setting unit may be configured by at least an external control device for selecting and setting at least a timer. The controller operates the light emitting unit according to activations of the sensing control unit and the time setting unit. For instance, the security light is turned on by the motion sensor upon detection of an intrusion to generate an illumination; the illumination continues for a preset time period of the timer preselected by the external control device, wherein when the timer runs out the preset time period the illumination is either turned off totally or switched to a low level illumination. In the supplemental disclosure, the timer operable with the controller and modifiable automatically is useful for efficiently controlling illuminations generated by the light emitting unit for at least two operating time periods. A first operating time period is a light-on duration determined by a preset delay time controlled by the timer. The light-on duration may range from seconds to hours depending on illumination needs. A second operating time period directly following the light-on duration is a short duration designed for turning off the light emitting unit. In the second operating time period, the controller in conjunction with a motion sensor of the sensing control unit performs a shutoff transition mode to turn off the light emitting unit. The shutoff transition mode provides a soft turnoff process to mitigate inconvenience caused by an unexpected or a sudden shutoff of light. The short duration of the shutoff transition mode may be in a range of 5 to 10 seconds, however, not to limit the scope of the supplemental disclosure.

Figure 10:
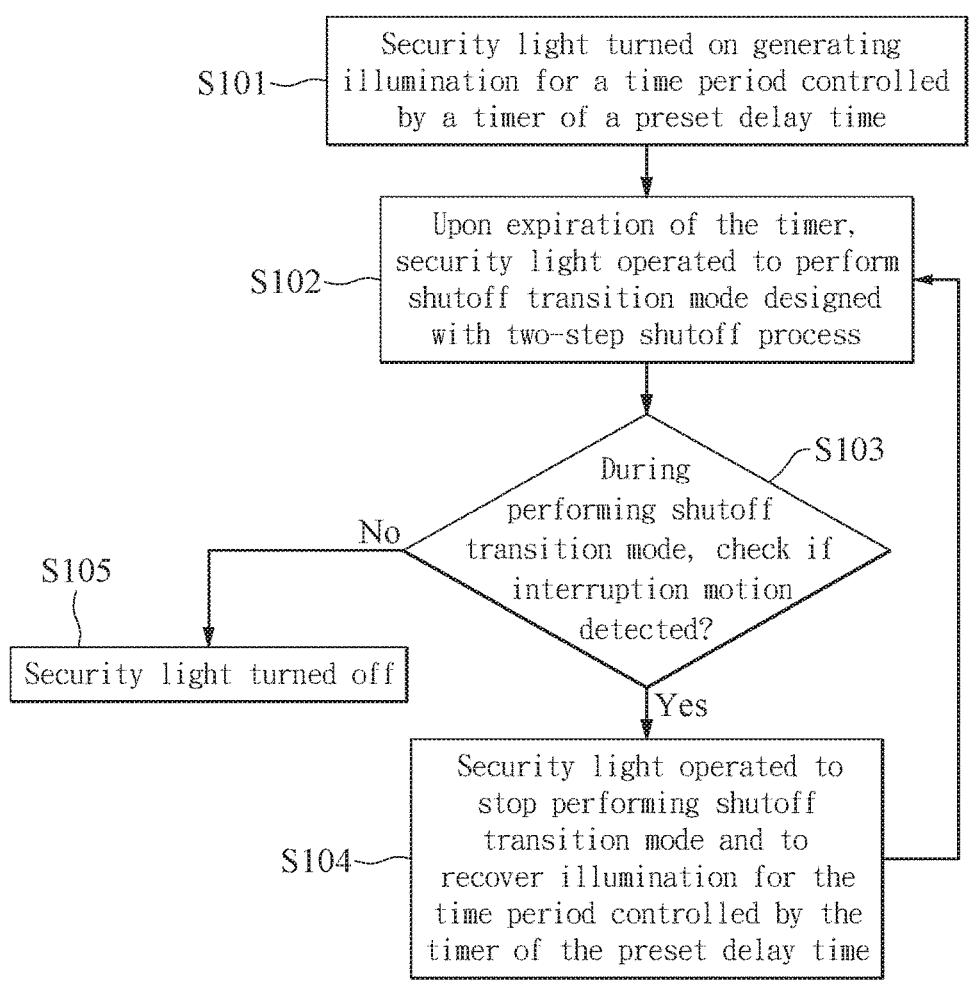
FIG. 10 schematically illustrates a block diagram of operating a shutoff transition mode using a soft off approach characterized with a two-step shutoff process to avoid an unexpected shutoff of light in accordance with a first exemplary embodiment of a supplemental disclosure.

Please refer to FIG. 10 which is an operating flow chart for the shutoff transition mode representing a first exemplary embodiment of the supplemental disclosure. FIG. 10 schematically illustrates a first technology for configuring a user friendly motion sensing security light; wherein the shutoff transition mode is disclosed to avoid a hardship or an inconvenience caused by an unexpected shutoff of a light upon a maturity of the timer when the timer runs out the preset delay time for operating the light-on duration. The shutoff transition mode is configured with a two-step shutoff process, wherein during a first step shutoff process, the illumination is instantly dropped to a noticeably lower level for a first short time period followed by a second step shutoff process to shutoff the illumination over a second short time period, the first step shutoff process is used for delivering a message signal to an occupant remaining in the living space that the light will be shutoff shortly, the occupant upon receiving the message signal may responsively react to generate an interruption motion signal detectable by the motion sensor to stop performing the shutoff transition mode, the controller thereby operates to instantly resume the illumination back to a full power level continuing for the preset delay time counted by the timer and subsequently to restart performing a new cycle of the shutoff transition mode for turning off the light such that the hardship of unexpected shutoff can be avoided.

In step S101 of FIG. 10, the security light is instantly turned on to generate a full power illumination from a complete off state or from a low level illumination state upon detecting a motion signal in a living space by the motion sensor for a preset delay time controlled by a timer.

In step S102 of FIG. 10, upon the maturity of the timer of a preset delay time, the security light enters the shutoff transition mode wherein in the first step shutoff process the illumination is instantly reduced noticeably to a lower level for the first short time period and followed by the second step shutoff process the illumination is gradually turned off over the second short time period.

In step S103 of FIG. 10, the controller checks whether an interruption motion signal is detected by the motion sensor during performing the shutoff transition mode, if "yes" going to step 104 and if "no" going to step 105.

In step S104 of FIG. 10, during the performance of the shutoff transition mode an interruption motion signal is detected by the motion sensor, the controller responsively manages to stop the shutoff transition mode and operates to resume the full power illumination, subsequently the controller operates to return to step S102 for another new cycle of the timer.

In step S105 of FIG. 10, upon an expiration of a time duration preset, which is a sum of the first short time period and the second short time period, for performing the shutoff transition mode with no motion signal further detected during the shutoff transition mode, the security light is then successfully turned off.

Figure 11:
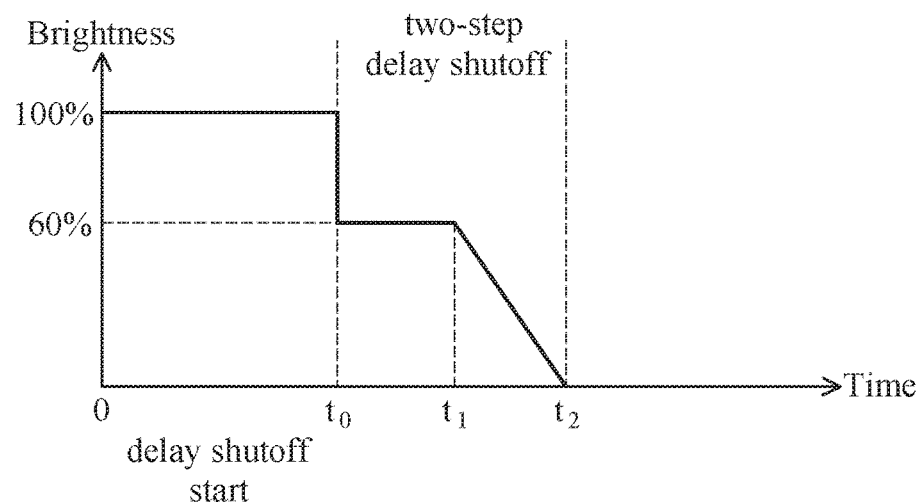
FIG. 11 is a schematic drawing of a timing diagram illustrating the performance of a two-step shutoff process after an occupant has left the detection space in accordance with the first exemplary embodiment of FIG. 10.

In accompanying with FIG. 10, please refer to FIG. 11 which is a schematic drawing of a timing diagram illustrating the lighting performance of the two-step shutoff process, wherein the security light is successfully turned off after an occupant has left a detection space in accordance with the embodiment of FIG. 10. As shown in FIG. 11, the security is turned on with a full power illumination of 100% brightness for a light-on duration given by a time period $t_0-0$ (S101). At a time point $t_0$, the security light starts to perform the shutoff transition mode by reducing the illumination noticeably to a low level of 60% brightness for the first short time period given by a first time interval $t_1-t_0$ and then gradually to decrease the illumination gradually from 60% brightness to zero for the second short time period given by a second time interval $t_2-t_1$ (S103, S105). FIG. 11 is an example to explain the shutoff transition mode for the case of no interruption motion signal detected during the shutoff transition mode, however, not to limit the scope of the supplemental disclosure.

Figure 12:
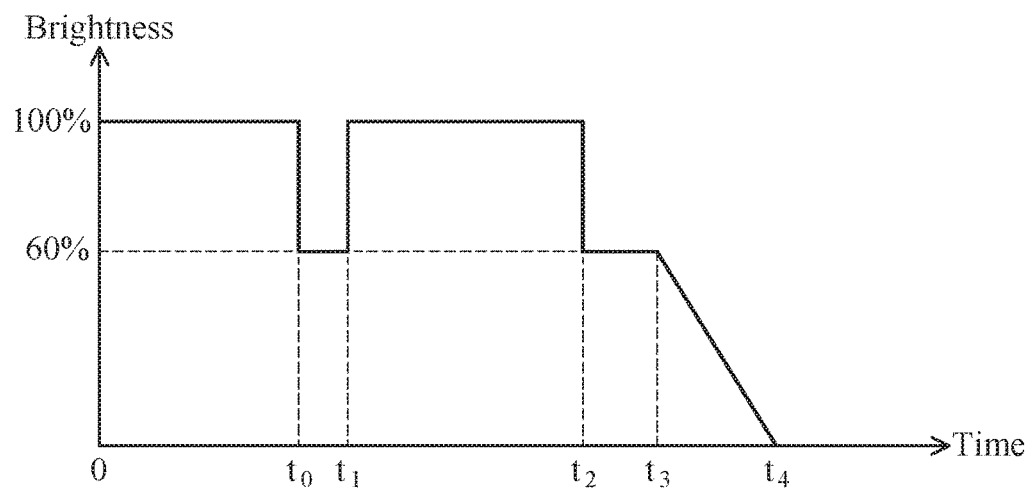
FIG. 12 is a schematic drawing of a timing diagram performing a reactivation of light in the shutoff transition mode when a motion interruption is performed by an occupant remaining in the detection area in accordance with the first exemplary embodiment of FIG. 10.

In accompanying with FIG. 10, please refer to FIG. 12 which is a schematic drawing of a timing diagram illustrating a reactivation of light in the shutoff transition mode when an interruption motion is performed by an occupant remaining in the detection space in accordance with the embodiment of FIG. 10. As shown in FIG. 12, the security light is turned on with an illumination of 100% brightness for a light-on duration given by the time period $t_0-0$ (S101). At a time point $t_0$, the security light starts to perform the shutoff transition mode by reducing the illumination noticeably to a low level of 60% brightness (S102) until a time point $t_1$ when an interruption motion signal is detected (S103, S104). The controller thereby operates to instantly recover the illumination back to 100% brightness at the time point $t_1$, the illumination thereafter continues for the preset delay time counted by the timer given by a time period $t_2-t_1$ which is equal to $t_0-0$ (S104). Subsequently at a time point $t_2$ the controller restarts to perform a new shutoff transition mode for turning off the light, (S102). During the new shutoff transition mode, the first step shutoff process ends at a time point $t_3$ followed by the second step shutoff process with no new interruption motion signal detected wherein the illumination is reduced gradually and turned off at a time point $t_4$. (S103, S105). FIG. 12 is a timing diagram to explain the shutoff transition mode for the case of an interruption motion signal being detected, however, not to limit the scope of the supplemental disclosure.

Figure 13:
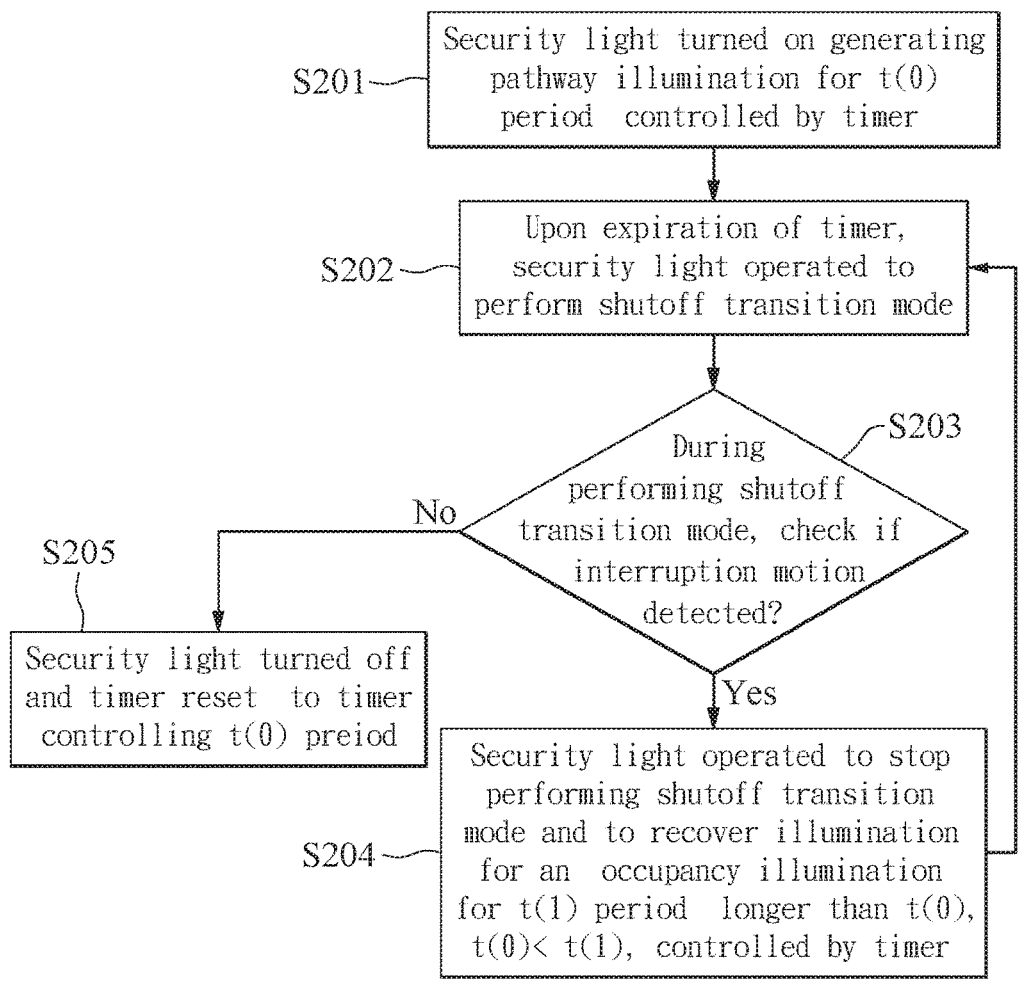
FIG. 13 schematically illustrates a block diagram of operating an enhanced shutoff transition mode with a timer escalation algorithm to form a dual mode security light capable of serving both a pathway security light and a temporary occupancy security light according to a second exemplary embodiment of the supplemental disclosure.

Please refer to FIG. 13 which comprises an operating flow chart representing a second exemplary embodiment of the supplemental disclosure. FIG. 13 schematically illustrates a second technology for configuring the security light, wherein a timer having capability to dynamically adjust delay time length for different illumination needs is disclosed. The second exemplary embodiment is an enhancement of the first exemplary embodiment built on the framework of the shutoff transition mode disclosed in the first embodiment; wherein whenever a motion interruption signal is detected by the motion sensor during the shutoff transition mode, the controller manages to immediately stop the performance of the shutoff transition mode and bring the light back on to generate the full power illumination, at the same time the controller operates to change the timer with a new preset delay time t(1) longer than a former preset delay time t(0), namely t(1)>t(0), according to a timer escalation algorithm. The timer escalation algorithm has a design to automatically increase the preset delay time; such an design enables a user to remotely and continuously lengthen the timer on the spot with a simple interruption motion during performing each shutoff transition mode for changing the timer to a long timer with a long delay time to operate the light-on duration triggered by the motion sensor till the security light is successfully turned off; additionally with such arrangement the security light can become an even more user friendly device which can flexibly serve both a pathway illumination need and a temporary occupancy illumination need whenever needed. It is therefore feasible to configure the timer with at least two different delay times including a short delay time t(0) (e.g. 30 seconds or shorter) for serving the pathway illumination need and a long delay time t(1) (e.g. 20 minutes or longer) for serving the temporary occupancy illumination need. The timer is reset to the short delay time each time when the light is successfully turned off for operating the next motion intrusion event.

In step S201 of FIG. 13, the security light is instantly turned on to generate a full power illumination from a complete off state or from a low level illumination state upon detecting a motion signal in the living space by the motion sensor for a preset short delay time t(0) controlled by a short timer.

In step S202 of FIG. 13, upon the maturity of the timer, the security light enters the first step shutoff process of the shutoff transition mode by instantly reduce the illumination level to a noticeably lower level for a first short time period followed by the second step shutoff process to gradually shutoff the illumination over a second short time period, the first step shutoff process is used for delivering a message to the occupant remaining in the living space that the light will be shutoff shortly.

In step S203 of FIG. 13, the controller checks whether an interruption motion is detected by the motion sensor in performing the shutoff transition mode, if "yes" going to step 204 and if "no" going to step 205.

In step S204 of FIG. 13, wherein during the performance of the shutoff transition mode following an expiration of the timer for generating a pathway illumination, the occupant remaining in the living space reacts to a sudden drop of illumination with a motion to stop the performance of the shutoff transition mode, the controller thereby operates to resume the full power illumination of the security light and reset the timer to operate a long timer with a long delay time t(1) for generating a temporary occupancy illumination, wherein upon the expiration of the long timer the security light starts performing a new cycle of the shutoff transition mode (S202, S203, S204) until successfully being turned off (S203, S205), the timer is then reset to operate the short timer t(0) for operating a new cycle of motion intrusion event. Thus the security light has a dual mode capacity able to serve both the pathway illumination need and the temporary occupancy illumination need.

In step S205 of FIG. 13, the security light is successfully turned off in the absence of any interruption motion signal during the shutoff transition mode, and controller resets the timer back to the short timer for controlling a short t(0) period.

Figure 14:
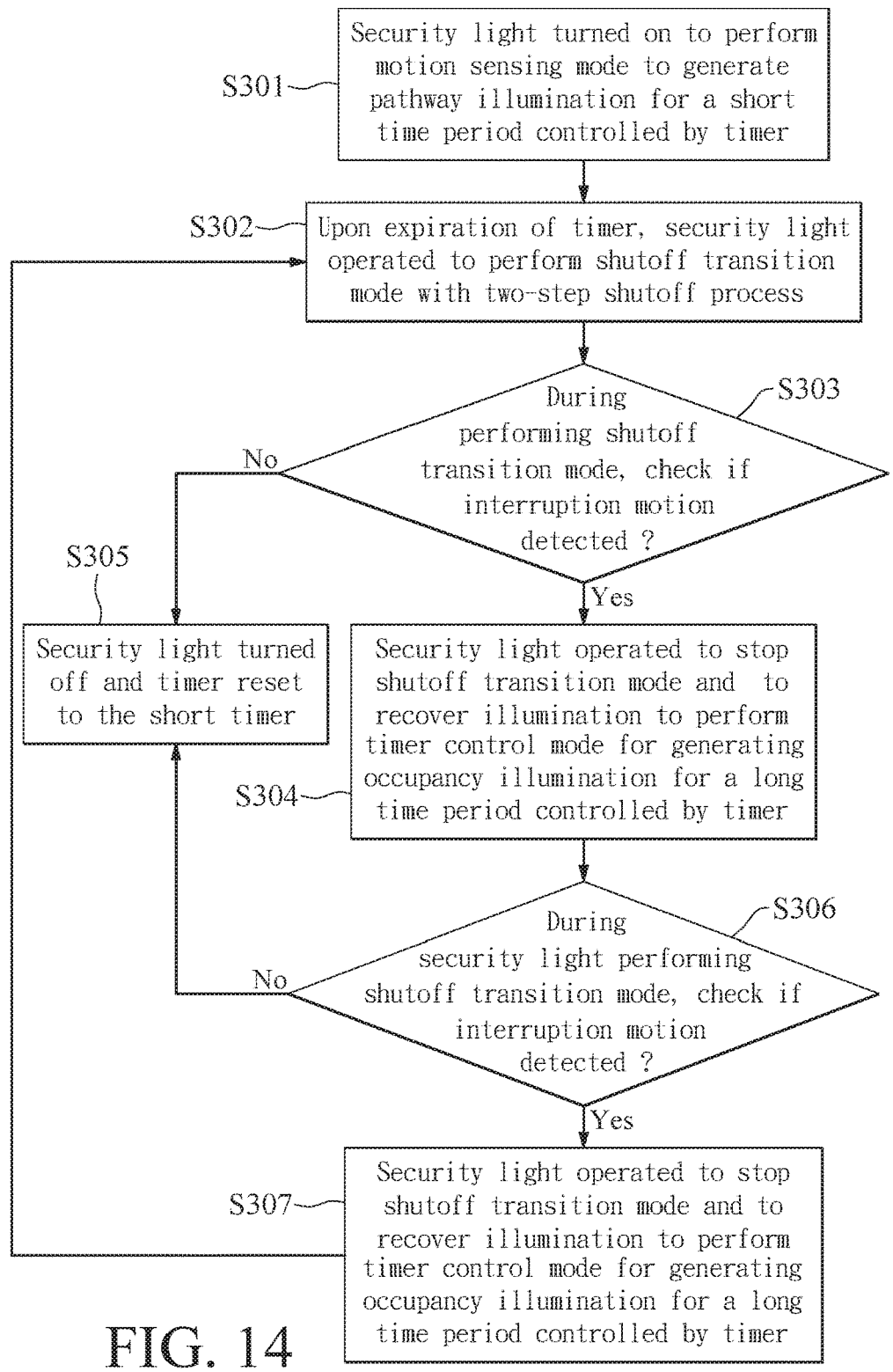
FIG. 14 schematically illustrates a block diagram of a hybrid structure designed to further improve the energy efficiency of the dual mode security light disclosed in FIG. 13 of the second exemplary embodiment in accordance with a third exemplary embodiment of the supplemental disclosure.

Please refer to FIG. 14 which is an operating flow chart representing a third exemplary embodiment of the supplemental disclosure. The third exemplary embodiment is a hybrid structure designed to further improve the energy efficiency of the security light for performing dual modes to serve both a pathway illumination need and a temporary occupancy illumination need. The hybrid structure as illustrated in FIG. 14 has a design for automatically operating a change of performance mode from a motion sensing mode for providing a pathway illumination to a timer control mode for providing a temporary occupancy illumination. In energy saving design the security light is normally activated by the motion sensor to perform the motion sensing mode to provide the pathway illumination for a short time period followed by performing the shutoff transition mode, wherein at the time when a motion interruption signal is detected during the shutoff transition mode, the timer control mode is activated, wherein the controller manages to switch the illumination from the pathway illumination to the temporary occupancy illumination with the motion sensor being temporarily deactivated till a long timer with a long delay time preset expires, wherein upon the expiration of the long timer for providing the temporary occupancy illumination, the controller manages to synchronously reactivate the motion sensor for a short time period to perform the shutoff transition mode, wherein if no interruption motion is detected, the security light is then successfully turned off and is reset for detecting the next motion intrusion event, wherein if an interruption motion is detected during the short time period of the shutoff transition mode, the timer control mode is activated and the controller manages to continue to operate another cycle of the timer control mode controlled by the long timer for providing the temporary occupancy illumination till the long timer expires and the security light then again enters another shutoff transition mode with the motion sensor reactivated to determine if another cycle of the timer control mode controlled by the long timer for providing the temporary occupancy illumination is needed. With such arrangement the security light may automatically change performance mode from the motion sensing mode to the timer control mode for adapting to real-time occupancy condition in the living space, wherein the security light will not perform a final cycle of the long timer for providing the temporary occupancy illumination after the occupant leaves the living space and the security light is automatically turned off and reset for detecting the next motion intrusion event. The third exemplary embodiment for performing dual modes is an energy saving design to configure the security light to avoid an energy waste for performing illumination with a long light-on duration after an occupant leaves the living space.

In step S301 of FIG. 14, the security light activated by the motion sensor is instantly turned on to generate a full power illumination from a complete off state or from a low level illumination state upon detecting a motion signal in the living space by the motion sensor for a preset short delay time controlled by a short timer.

In step S302 of FIG. 14, wherein upon the maturity of the short timer of the preset short delay time, the security light enters the first step shutoff process of the shutoff transition mode by instantly reduce the illumination level to a noticeably lower level for a first short time period followed by the second step shutoff process to gradually shutoff the illumination over a second short time period.

In step S303 of FIG. 14, the controller checks whether an interruption motion is detected by the motion sensor in performing the shutoff transition mode, if "yes" going to step 304 and if "no" going to step 305.

In step S304 of FIG. 14, wherein during the performance of a shutoff transition mode following the expiration of a short timer with the preset short delay time for generating a pathway illumination, the occupant remaining in the living space reacts to a sudden drop of illumination with a motion to stop the performance of the shutoff transition mode, the controller thereby operates to resume the full power illumination of the security light and manages the security light to enter a timer control mode performed with a long timer for generating a temporary occupancy illumination with the motion sensor being deactivated, wherein upon the expiration of the long timer the controller manages the security light to enter another cycle of performing the shutoff transition mode with the motion sensor being reactivated, wherein if no motion signal is detected during the performance of the shutoff transition mode the security light is then successfully turned off.

In step S305 of FIG. 14, the security light is successfully turned off in the absence of any interruption motion signal received during the performance of the shutoff transition mode, and the controller resets the timer back to the short timer for the preset short delay time. Hence the security light simply performs the function of a pathway illumination security light operated with the short timer.

In step S306 of FIG. 14, following step S304 of the timer control mode the controller upon expiration of the long timer checks if an interruption motion is detected by the motion sensor in performing the shutoff transition mode, if "yes" going to step 307 and if "no" going to step 305.

In step S307 of FIG. 14, wherein if a motion signal is detected during a subsequent shutoff transition mode, the controller manages to repeat the performance of the timer control mode with the motion sensor being deactivated for another cycle of the long timer configured by cyclic steps S302, S303, S304, S306 and S307. Thus the security light is able to serve both the pathway illumination need and the temporary occupancy illumination need with no energy waste for running a final cycle of the long timer after the occupant leaves the living space.

Figure 15A:
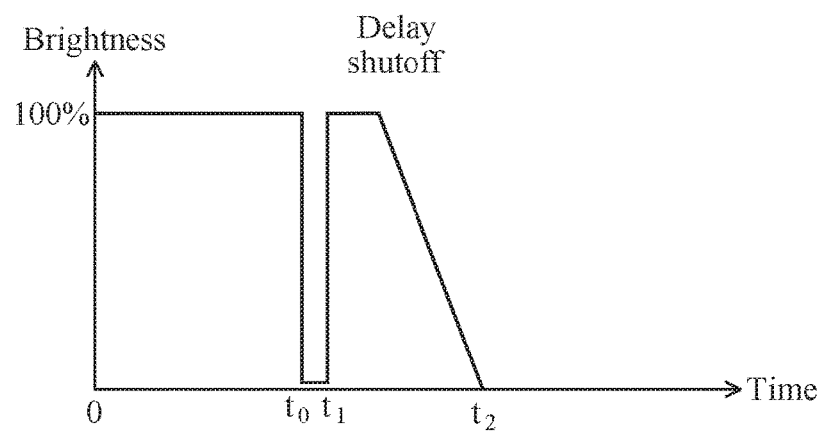
FIG. 15A and FIG. 15B depict schematically timing diagrams illustrating an arrangement with an instant power interruption in performing the shutoff transition mode in accordance with a fourth exemplary embodiment of the supplemental disclosure.
Figure 15B:
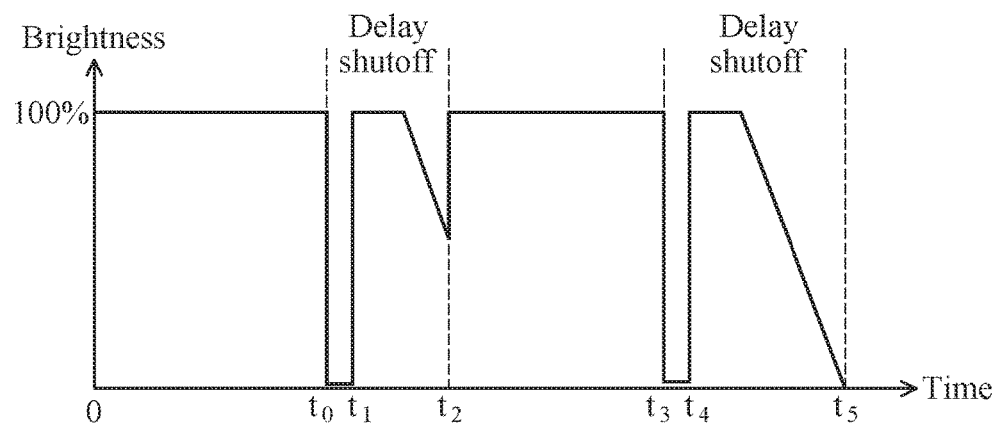

Please refer to FIG. 15A and FIG. 15B which draw schematically timing diagrams illustrating an alternative arrangement in performing the shutoff transition mode. FIG. 15A illustrates the light of 100% brightness continues for a delay time controlled by a short timer and starts performing the shutoff transition mode at a time point $t_0$ by an instant power interruption to turn off the light for a short time period $t_1-t_0$ and then recovering instantly the light back to 100% brightness followed by gradually turning off the light at a time point $t_2$. The sudden drop of illumination level to 60% brightness as illustrated in the timing diagrams of FIG. 11 and FIG. 12 for performing the first step shutoff process of the shutoff transition mode can be replaced with an arrangement of an instant interruption of illumination upon the maturity of the short timer as an alternative for delivering the warning message to inform the occupant remaining in the living space and then followed by the performance of a shutoff transition mode; in such case the security will perform a full power illumination during the first short time period. This alternative arrangement represents a fourth exemplary embodiment of the supplemental disclosure; wherein upon the expiration of the short timer, the controller manages to perform an instant power interruption such that the light is instantly turned off and turned back on to serve as a warning message to inform the occupants remaining in the living space, followed by the performance of a shutoff transition mode, wherein the security light performs a first step shutoff process to continue a full power illumination for the first short time period followed by a gradual turn off over the second short time period. In FIG. 15B, the timing diagram illustrates the shutoff transition mode beginning at the time point $t_0$ by instantly turn off the light for a short period $t_1-t_0$ and followed with an a reactivation of light at a time point $t_2$ during performing the shutoff transition mode when an interruption motion generated by an occupant in the detection space is detected in accordance with the fourth exemplary embodiment, wherein the security light continues illumination of 100% brightness until a time point $t_3$ at which another shutoff transition mode is performed from the time point $t_3$ to a time point $t_5$, wherein the security light is successfully turned off in the absence of a motion signal detected during the performance of the shutoff transition mode.

A third technology for configuring the security light of the supplemental disclosure is a timer setting algorithm for automatically setting a timer value featuring motion characteristics of occupants staying in a detection space. In the following, the term "the value of timer" or "the timer value" means equally "a time length" or "a delay time" of the timer to determine the light-on duration as mentioned in the above text. The timer setting algorithm is configured with two setting processes for automatically setting the timer which can effectively manage turn-on and turn-off operation of light according to an occupancy status of a living space; wherein a first setting process is operated by a machine learning software designed to search for a maximum motionless duration in each motion intrusion event using the timer escalation algorithm of the second technology afore described to repeatedly renew and increase the value of timer till reaching an ultimate value which first surpasses a maximum motionless duration for an occupant staying in the living space such that the light will not be turned off so long as the occupant remains in the detection space and the light will only be turned off when the timer with the ultimate value successfully expires. The following is a recurring formula expressing one of many possible timer escalation methods which can be used to approach and identify the ultimate value of timer for automatically setting the timer, $$t(n)=t(0)+n\cdot\Delta t,$$

where n, with n=0, 1, 2, 3 . . . , is a sequence number indicating nth motion being detected, t(n) is a temporary timer value resulted from nth motion detection, t(0) is an initial timer value, and $\Delta t$ is an increment to increase the timer value on each motion detection.

In the recurring formula, t(n) is a recurring variable representing the timer value being continuously increased and updated to test and identify an ultimate value of timer which first surpasses the maximum motionless duration in a motion intrusion event, when the light is successfully turned off upon the maturity of an updated value of timer without any occurrence of the light being reactivated during the occupant remaining in the detection space, the value of timer so far updated is therefore identified as the ultimate value to be considered for automatically setting the timer and the first setting process is completed for current motion intrusion event. If on detections of m motion events, a value of timer T(m) first surpasses the maximum motionless duration, T(m) represents an identified ultimate value in the m time motion intrusion event. The timer setting algorithm will continue to perform the first setting process in M subsequent motion intrusion events to identify and produce more ultimate values of timer to build a data base in the succeeding motion intrusion events featuring the motion characteristics of people entering and leaving the detection space. The recurring formula as expressed above belongs to an arithmetic progression method for approaching the ultimate value.

A geometric progression method or a hybrid method combining an arithmetic progression followed by a geometric progression at an interim point during the first setting process could also be considered in order to more efficiently identify the ultimate value of timer for operating the security light.

The ultimate value of timer so derived is recorded as one sample of many ultimate values of the timer, the machine learning software continues to search for more ultimate values of timer up to a sufficient M number of motion intrusion events after the security light being installed in the detection space to build a data base to be used for further analysis in a second setting process, wherein the second setting process is operated by an inference software designed to analyze distribution characteristics of the data base of the ultimate values of timer collected from operating the machine learning software and determine an optimal value of timer representing motion characteristics in the detection space for operating the light-on duration triggered by a motion signal; wherein if the statistics of the ultimate values collected features a narrow distribution centered around a low mean value of time length (e.g., 20 seconds or shorter), the detection space is identified as a pathway space and the security light is installed for providing a pathway illumination need; wherein if the statistics of the ultimate values collected features a narrow distribution centered around a high mean value of time length (e.g., two minutes or more), the detection space is a temporary occupancy space and the security light is installed for providing a temporary occupancy illumination need; wherein if the statistics of the collected ultimate values feature the ultimate values collected are distinctly dividable into two groups of the ultimate values with a first group of the ultimate values centered around a low mean value and a second group of the ultimate values centered around a high mean value, it indicates the security serves both the pathway illumination need and the occupancy illumination need.

Regardless what pattern of statistical distribution of the data base, the supplemental disclosure is capable of deriving an optimal timer value from the data base with a mathematical process such that the timer value so derived covers variations of the ultimate values in all motion intrusion events in the detection space up to a predetermined high probability (e.g., 99.6%). In other words, with the optimal timer value so derived to operate the security light, the light will be turned on upon detecting a motion signal and with a predetermined high probability the light will be turned off only when the detection space becomes unoccupied. When the statistics of a normal distribution approach is used as the mathematical method for deriving an optimal timer value, the first step is to calculate the mean value of all ultimate values in the data base, the second step is to calculate the standard deviation and the third step is to decide the multiple of standard deviation to add to the mean value to come out the value of timer selected for operating the security light. If one standard deviation is added to the mean value the probability covers up to 66.6% of variation of the ultimate values and if two standard deviation are added to the mean value the probability coverage becomes 99.6%. The normal distribution inference approach is not the only one of many mathematical methods that can be used for deriving the optimal timer value and the supplemental disclosure is not confined to any method of analyzing the data base of ultimate timer values collected from operating the machine learning software to determine the optimal timer value representing motion characteristics of occupant in the detection space for operating the light-on duration triggered by a motion signal. For example, the most simple approach would be just picking up the highest value among the ultimate values recorded in the data base collected. While the third technology is developed for automatically setting a timer value based on motion characteristics performed in the detection space over a sufficient sample space of intrusion events during an initial period after installation, it can be further integrated with the first technology or the second technology to make the supplemental disclosure an even more complete solution for managing an occupancy illumination in a living space in an unusual event; wherein when the timer value has been set automatically, the security light is turned on to generate an illumination upon detecting a motion sensing signal for a duration of the timer value, wherein upon a maturity of the timer value the security light enters a shutoff transition mode, wherein the shutoff transition mode is configured with a two-step shut off process, wherein during the first step shutoff process, the illumination is instantly dropped to a noticeably lower level for a first short time period followed by a second step shutoff process to gradually shutoff the illumination over a second short time period, the first step shutoff process is used for delivering a message to the occupant remaining in the detection space that the light will be shutoff shortly, the occupant upon receiving the message may responsively act to generate an interruption motion signal detectable by the motion sensor to stop the delay shutoff process, the controller thereby operates to instantly resume a full power illumination and restart a new timer value for continuing illumination such that an sudden and unexpected shutoff of light can be avoided, wherein the new timer value can be a repeat of the timer value determined automatically by the third technology, a preset timer value or a renewed timer value according to a time length escalation arrangement. The renewed timer value is only a temporary setting good for the current motion intrusion event. With such configuration the security light of the supplemental disclosure is able to perform a lighting control according to an occupancy status of an installed living space based on an inference drawn on a data base of motion characteristics. Additionally, a further integration with the first or the second technology ensures the security light able to manage extreme situation, wherein a motionless duration is longer than the timer value set automatically. When the security light is turned off, the timer value is reset to the timer value of a preset short delay time for operating the next motion intrusion event.

Figure 16:
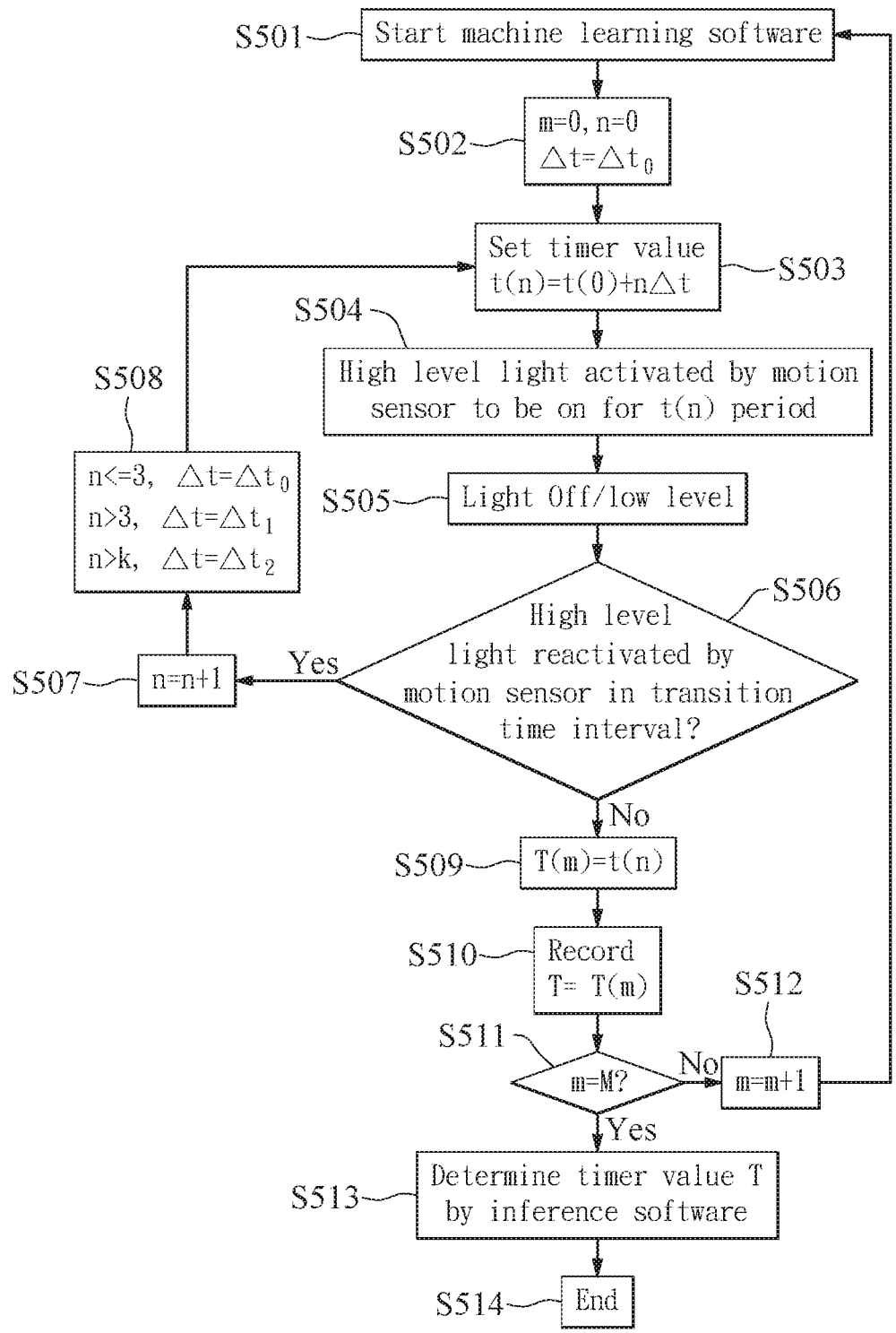
FIG. 16 schematically illustrates a block diagram of an automatic timer setting algorithm in accordance with a fifth exemplary embodiment of the supplemental disclosure for determining an optimal value of timer based on analysis of users' motion characteristics in the installed location and inference drawn on collected data from initial intrusion events.

Please refer to FIG. 16 which schematically illustrates a system operating flow chart of the timer setting algorithm of the third technology for configuring the security light. FIG. 16 represents a fifth exemplary embodiment of the supplemental disclosure. The initial timer value t(0) is set at a low value to start setting process, for instance, t(0)=30 s.

For operating the timer setting algorithm two sequence numbers, n and m, are used for respectively controlling proceeding of the first setting process and second setting process. FIG. 16 starts the first setting process by operating the machine learning software (S501). The sequence numbers m, n and the increment $\Delta t$ are initially set respectively as m=0, n=0, and $\Delta t=\Delta t_0$ (S502). A delay time or the timer value is given by the recurring formula $t(n)=t(0)+n \cdot \Delta t$ for operating the security light (S503). Initially, when a motion intrusion is detected by the motion sensor, the security light is turned on from a cutoff state to a high level illumination state, or from a low level illumination to the high level illumination continuing for a light-on duration equal to the delay time t(0) (S504). Upon the maturity of the timer with a delay time t(0), the light is turned off or is reduced from the high level illumination to the low level illumination (S505); wherein if the light is not reactivated within a transition time interval (S506), say 20 seconds, which indicates the detection space is unoccupied and the timer value of t(0) is long enough to cover the maximum motionless duration, the first setting process is then ended to conclude with an ultimate value being identified as t(0), with T(0)=t(0) (S509); wherein if the light is reactivated within the transition time interval (S506), which indicates the occupant is still in the detection space and the timer value t(n) may not be not long enough to cover the maximum motionless duration for the occupant remaining in the detection space, the timer setting algorithm executed by the controller operates to increase the timer value by an increment of $\Delta t$ and at the same time the sequence number n is added by 1 (S507). Three options to select a value of the increment $\Delta t$ (S508) are provided for increasing the timer value t(n) according to the recurring formula $t(n)=t(0)+n \cdot \Delta t$ (S503). From this point on the timer setting algorithm formally starts to operate the timer escalation algorithm to continuously and recurrently search for the ultimate value of timer till at a point when a final search round with a continuously increased timer value satisfies the condition that the light is successfully turned off without being reactivated within the transition time interval, then the first setting process is completed with the last increased timer value t(n) being identified as the ultimate value T(m) of timer T(m)=t(n) (S509), and to be recorded as T=T(m) (S510). When the ultimate vale T(m) is found, the sequence number m if less than a number M (S511) is added by one (S512) for resuming the next cycle started from step S(501). A collection of the ultimate values T(0), T(1), . . . , and T(M) after operating M cycles of the first setting processes is a data base for further analysis by operating the inference software to determine a optimal value T of the timer value (S513) for ending the timer setting algorithm (S514). During the first setting process (S501-S508), if n becomes greater than 3 or any predetermined value, it indicates the detection space is not a pathway space and the ultimate value of timer could be much longer than t(3), with t(3)=30 s+3·20 s=90 s, then the recurring formula needs to be modified from the arithmetic progression to the geometric progression or a predetermined collection of non-linear values to accelerate the first setting process (S508). As shown in FIG. 16, when n becomes greater than 3, $\Delta t = \Delta t_1$, with $\Delta t_1 > \Delta t_0$, which uses a higher value $\Delta t_1$ per increment to accelerate the first setting process. Further, when n becomes greater than k, then $\Delta t = \Delta t_2$, with $\Delta t_2 > \Delta t_1$, which uses a much higher value $\Delta t_2$ per increment to further speed up the first setting process such that the ultimate value of timer can be quickly identified.

The timer setting algorithm for configuring the security light is designed to continuously and recurrently operate the first setting process and identify sets of the ultimate values for successive motion intrusion events and record each ultimate value, T(0), T(1), . . . , T(M), in a data base for performing an inference method to select an optimal ultimate value to most adequately preset the timer for operating the security light.

The second setting process operated by the inference software is designed to analyze the distribution characteristics of the ultimate values of timer collected from the first setting process operated by the machine learning software. The distribution characteristics of the ultimate values of timer may feature a single distribution pattern or a dual distribution pattern; wherein the single distribution pattern indicates the security light in the detection space is either for performing and serving the pathway illumination need or the occupancy illumination need, and the dual distribution pattern it indicates the security light in the detection space is for performing and serving both the pathway illumination need and the occupancy illumination need. For the dual distribution pattern, the data base of the ultimate values of timer is dividable into two sets of ultimate values to respectively preset a first timer for performing the pathway illumination need and a second timer for performing the occupancy illumination need.

There are many different methods which can be employed to select the ultimate value for most adequately setting the timer. For instance, the simplest approach is a straight selection of the highest value among the M set of ultimate values in the data base, or the use of weighted average approach or the most sophisticated normal distribution approach as described in the previous paragraph.

Through operating the inference software it may be found that the distribution pattern of the data base features two normal distributions with the data pool of ultimate values are dividable into two groups of data values, wherein a first group of data values centered around a low mean value and a second group of data values centered around a high mean value, which indicates the security light in the detection space effectively performs both a pathway illumination function and an occupancy illumination function, in such case the dual mode technology disclosed in FIG. 13 of the second exemplary embodiment or the hybrid dual mode technology disclosed in FIG. 14 of the third exemplary embodiment may be applicable. In such case, two timers need to be searched and identified as the first timer and the second timer respectively with a lower timer value for serving the pathway illumination need and a higher timer value for serving the occupancy illumination need.

The above-mentioned descriptions represent merely the exemplary embodiments of the present disclosure and the supplemental disclosure, without any intention to limit the scope of the present disclosure and the supplemental disclosure thereto. Various equivalent changes, alternations or modifications based on the claims of present disclosure are all consequently viewed as being embraced by the scope of the present disclosure and the supplemental disclosure.

What is claimed is:

1. A method for eliminating a hardship of an unexpected shutoff of light in using a motion activated lighting device for an occupancy lighting solution, comprising:
providing a motion sensor working in conjunction with a controller circuitry to turn on a lighting device to perform a high level illumination upon detecting a motion signal and continue the high level illumination for a time duration set by an operating timer before entering a process to turnoff the lighting device;
providing a shutoff transition mode to turnoff the lighting device over a predetermined time period upon a maturity of the time duration set by the operating timer, wherein the shutoff transition mode is designed with a two-step shutoff process in the predetermined time period, wherein during a first step shutoff process, the high level illumination is instantly dropped to a noticeably lower level illumination followed by a second step shutoff process to turn off the lower level illumination at an end of the predetermined time period;
providing the instant drop of light from the high level illumination to the noticeably lower level to serve as a warning signal to an occupant remaining in a detection space; and
providing an interruption motion signal generated by the occupant responding to the warning signal to stop the two-step shutoff process and restart a new cycle of the high level illumination with a new operating timer;
wherein during the shutoff transition mode if no motion signal is detected indicating the detection space is unoccupied, the lighting device is thereby successfully turned off.

2. The method for eliminating a hardship of an unexpected shutoff of light according to claim 1, wherein the new operating timer has a time duration equal to the time duration of the operating timer used prior to restarting the new cycle of the high level illumination.

3. The method for eliminating a hardship of an unexpected shutoff of light according to claim 1, wherein the new operating timer is programmed to have a time duration longer than the time duration of the operating timer used prior to restarting the new cycle of the high level illumination according to a timer escalation algorithm, wherein the timer escalation algorithm continues to generate a new value of the operating timer with a longer time duration to replace the previous value of the operating timer according to each new interruption motion signal detected.

4. The method for eliminating a hardship of an unexpected shutoff of light according to claim 3, wherein the timer escalation algorithm uses a linear method to escalate the value of the operating timer.

5. The method for eliminating a hardship of an unexpected shutoff of light according to claim 4, wherein the linear method for escalating the value of the operating timer is operated according to the following iteration formula $t(n)=t(0)+n \cdot \Delta t$, wherein $t(0)$ is a preset initial value of the operating timer, $t(n)$ is an iterative variable of the operating timer being updated according to the nth interruption motion signal detected during a nth cycle of the shutoff transition mode, wherein n is the occurrence sequence of entering the shutoff transition mode and the value of the operating timer $\Delta t$ is an increment of time duration.

6. The method for eliminating a hardship of an unexpected shutoff of light according to claim 5, wherein the increment of time duration $\Delta t$ can be programmed to step up at different point(s) of occurrence sequence of the interruption motion signal.

7. The method for eliminating a hardship of an unexpected shutoff of light according to claim 3, wherein the timer escalation algorithm uses a non-linear method to escalate the value of the timer at a faster pace.

8. A method for configuring a dual mode motion sensing security light capable of serving both a pathway illumination need and an occupancy illumination need, comprising:
   providing a motion sensor working in conjunction with a controller to turn on a lighting device upon detecting a first motion signal to perform a first illumination mode with a first high level illumination and continue the first high level illumination for a short time duration set by a short timer before entering a process to turnoff the lighting device, wherein the first illumination mode is for serving a pathway illumination need;
   providing a shutoff transition mode to turnoff the lighting device over a predetermined time period upon a maturity of the short time duration set by the short timer, wherein the shutoff transition mode is designed with a two-step shutoff process in the predetermined time period, wherein during a first step shutoff process, the first high level illumination is instantly dropped to a noticeably lower level illumination followed by a second step shutoff process to turn off the lower level illumination at an end of the predetermined time period;
   providing the instant drop of light from the first high level illumination to the noticeably lower level to serve as a warning signal to an occupant remaining in a detection space; and
   providing an interruption motion signal generated by the occupant responding to the warning signal to stop the two-step shutoff process and manage to perform a second illumination mode with a second high level illumination for a long time duration set by a long timer before entering the process to turn off the lighting device, wherein the second illumination mode is for serving a occupancy illumination need;
   wherein during the shutoff transition mode if no motion signal is detected indicating the detection space is unoccupied, the lighting device is thereby successfully turned off.

9. The method for configuring a dual mode motion sensing security light according to claim 8, wherein upon the maturity of the long time duration, the controller manages the security light to enter the shutoff transition mode; wherein during the predetermined time period of the shutoff transition mode if an interruption motion signal from the occupant remaining in the detection space is further detected by the motion sensor, the controller manages to instantly resume the second illumination mode to perform the second high level illumination with a new cycle counting of the long time duration controlled by the long timer before entering another cycle of the turn off process.

10. The method for configuring a dual mode motion sensing security light according to claim 8, wherein upon the maturity of the long time duration set by the long timer, the controller manages the security light to enter the shutoff transition mode; wherein during the predetermined time period of the shutoff transition mode if an interruption motion signal from the occupant remaining in the detection space is further detected by the motion sensor, the controller manages to instantly resume to perform the first illumination mode with the first high level illumination for a new cycle of the short time duration set by the short timer before entering another turnoff process.

11. The method for configuring a dual mode motion sensing security light according to claim 8, wherein upon the maturity of the long time duration, the controller manages the security light to enter the shutoff transition mode; wherein during the predetermined time period of the shutoff transition mode if no motion signal is further detected by the motion sensor, the security is thereby successfully turned off and the value of timer is reset to the initial value.

12. The method for configuring a dual mode motion sensing security light according to claim 8, wherein a light intensity of the second high level illumination is equal to a light intensity of the first high level illumination.

13. The method for configuring a dual mode motion sensing security light according to claim 8, wherein a light intensity of the second high level illumination is lower than the light intensity of the first high level illumination.

14. A method for configuring a hybrid dual mode motion sensing security light capable of serving both a pathway illumination and an occupancy illumination, comprising:
   providing a motion sensor working in conjunction with a controller to turn on the security light upon detecting a first motion signal to perform a first illumination mode with a first high level illumination and continue the first high level illumination for a short time duration set by a short timer before entering a process to turnoff the security light, wherein the first illumination mode is for serving the pathway illumination; wherein the first illumination mode is a motion sensing illumination mode with the motion sensor continuing to detect new motion to renew a time counting of the short time duration set by the short timer;
   providing a shutoff transition mode to turnoff the security light over a predetermined time period upon a maturity of the short time duration, wherein the shutoff transition mode is designed with a two-step shutoff process in the predetermined time period, wherein during a first step shutoff process, the first high level illumination is instantly dropped to a noticeably lower level illumination followed by a second step shutoff process to turn off the lower level illumination at an end of the predetermined time period;
   providing the instant drop of light from the first high level illumination to the noticeably lower level to serve as a warning signal to an occupant remaining in a detection space; and
   providing an interruption motion signal generated by the occupant responding to the warning signal to stop the two-step shutoff process and manage the security light to perform a second illumination mode with a second high level illumination for a long time duration before entering the turnoff process to turn off the lighting device, wherein the second illumination mode is for serving the occupancy illumination, wherein the second illumination mode is a non-motion sensing illumination mode with the motion sensor being temporarily suspended;

wherein upon the maturity of the long time duration, the controller manages the security light to enter the shutoff transition mode, wherein during the predetermined time period of the shutoff transition mode the motion sensor is reactivated;

wherein during the shutoff transition mode if no motion signal is detected indicating the detection space is unoccupied, the security light is thereby successfully turned off.

15. The method of configuring a hybrid dual mode motion sensing security light according to claim 14, wherein during the shutoff transition mode if an interruption motion signal is further detected by the motion sensor, the controller manages to instantly stop the two-step turnoff process and resume the security light to perform the second illumination mode for a new cycle of the long time duration before entering another turn off process.

16. The method for configuring a hybrid dual mode motion sensing security light according to claim 14, wherein during the shutoff transition mode if an interruption motion signal is further detected by the motion sensor, the controller manages to instantly stop the two-step turnoff process and resume the security light to perform the first illumination mode for a new cycle of the short time duration before entering another turn off process.

17. The method for configuring a hybrid dual mode motion sensing security light according to claim 14, wherein a light intensity of the second high level illumination is lower than a light intensity of the first high level illumination.

18. The method for configuring a hybrid dual mode motion sensing security light according to claim 14, wherein a light intensity of the second high level illumination is equal to a light intensity of the first high level illumination.

19. A method for setting a value of an automatic timer for operating a motion sensor activated security light being used for providing an occupancy illumination, wherein the automatic timer being set is capable of controlling a light-on time duration triggered by a motion signal according to an occupancy state of a detection space, the method comprising:

providing a machine learning software working in conjunction with a motion sensor and a controller to analyze motion characteristics of an occupant entering and staying in a detection space in a motion intrusion event and to identify an ultimate value of an operating timer to be considered for setting the automatic timer thru an operating timer escalation algorithm, wherein the operating timer escalation algorithm is configured with a recurring formula to repeatedly increase and renew a value of the operating timer till reaching the ultimate value which surpasses a maximum motionless duration for the occupant staying in the detection space such that the light is not turned off so long as the occupant remains in the detection space and the light is turned off only when the operating timer with the ultimate value successfully expires without being renewed, wherein the ultimate value of the operating timer so derived is recorded as one sample of the ultimate operating timer, the machine learning software continues to search for more ultimate values of operating timer for a sufficient M number of motion intrusion events after the security light being installed in a detection space to build a statistical data base to be used for determining a final value to be selected as the automatic timer;

providing an inference algorithm designed to analyze distribution characteristics of the statistical database collected from operating the machine learning software and to determine an optimal value of timer best representing motion characteristics in the detection space for operating the light-on duration triggered by a motion signal detected by the motion sensor.

20. The method for setting a value of an automatic timer for operating a motion sensor activated security light according to claim 19, wherein the operating timer escalation algorithm is designed with an initial value t(0) of the operating timer to start an iteration process by using the recurring formula to increase the value of the operating timer t(n) according to a frequency count n of the security light being shutoff and turned back on or a number of times of the motion signal being generated by the occupant to reactivate the security light while the occupant remaining in the detection space; wherein n=0 or positive integer, wherein when a nth motion signal is detected by the motion sensor, the controller manages to turn on the security light to perform a high level illumination for a time duration of t(n), wherein upon a successful expiration of t(n) the security light is either turned off or reduced to a lower level, wherein if the security light is reactivated within a predetermined time period indicating the occupant remaining in the detection space, the controller accordingly manages to instantly resumes the high level illumination and at the same time to change the value of the operating timer from t(n) to t(n+1) in response to a (n+l)th motion being detected according to the recurring formula of the iteration process, wherein such iteration process continues for a number of times till the ultimate value of the operating timer is identified such that the light is not turned off so long as the occupant remains in the detection space and the light is turned off only when the operating timer with the ultimate value successfully expires without being renewed.

21. The method for setting a value of an automatic timer for operating a motion activated security light according to claim 19, wherein if the statistical data base of the collected ultimate values features a narrow distribution centered around a low mean value of time length, the detection space is identified as a pathway space and the security light is installed for providing a pathway illumination.

22. The method for setting a value of an automatic timer for operating a motion activated security light according to claim 19, wherein if the statistical data base of the collected ultimate values features a narrow distribution centered around a high mean value of time length, the detection space is a temporary occupancy space and the security light is installed for providing a temporary occupancy illumination.

23. The method for setting a value of an automatic timer for operating a motion activated security light according to claim 19, wherein if the statistical data base of the collected ultimate values are distinctly dividable into two groups of ultimate values with a first group of ultimate values centered around a low mean value and a second group of ultimate values centered around a high mean value, it indicates the security light are frequently used for both a pathway illumination need and an occupancy illumination need, in such case two automatic timers are required to be established for serving a dual mode motion sensing security light configured with a first illumination mode being the pathway illumination mode operated by a short automatic timer and a second illumination mode being the occupancy illumination mode operated with a long automatic timer, wherein a shutoff transition mode is designed to bridge between operating the pathway illumination mode and operating the temporary occupancy illumination mode, wherein when a motion intrusion signal is detected by the motion sensor, the controller manages to turn on the security light to perform a first high level illumination for a short time duration controlled by the short automatic timer, wherein upon a maturity of the short automatic timer the controller manages to enter the shutoff transition mode, wherein the first high level illumination is instantly reduced to a noticeably lower level illumination for a predetermined time period, wherein if a new motion signal is further detected by the motion sensor during the predetermined time period, the controller manages to immediately stop the shutoff transition mode and switch the security light to perform the second illumination mode with a second high level illumination for a long time duration controlled by the long automatic timer;

wherein if no new motion signal is further detected the controller accordingly manages to turn off the security light at the end of the predetermined time period and the security light is reset for reacting to a new motion intrusion event.

24. The method for setting a value of an automatic timer for operating a motion activated security light according to claim 23, wherein a light intensity of the second high level is lower than a light intensity of the first high level illumination.

25. The method for setting a value of an automatic timer for operating a motion activated security light according to claim 23, wherein a light intensity of the second high level illumination is equal to a light intensity of the first high level illumination.

26. The method for setting a value of an automatic timer for operating a motion activated security light according to claim 19, wherein regardless the pattern of statistical distribution of the statistical data base the method is capable of deriving at least one optimal value for setting the automatic timer from analyzing the statistical data base thru a mathematical process such that the automatic timer so derived substantially covers the variation of ultimate values collected from operating the machine learning software.

27. The method for setting a value of an automatic timer for operating a motion activated security light according to claim 26, wherein the mathematical process used for analyzing the distribution characteristics and determining the optimal value for setting the automatic timer is a normal distribution approach comprising three steps, wherein a first step is to calculate the mean value of all ultimate values in the data collection, a second step is to calculate the standard deviation and a third step is to decide the multiple of standard deviation to add to the mean value to come out the value of automatic timer selected for operating the security light; wherein if one standard deviation is added to the mean value the probability covers up to 66.6% of variation of the ultimate values and if two standard deviation is added to the mean value the probability coverage becomes 99.6%.

28. The method for setting a value of an automatic timer for operating a motion activated security light according to claim 26, wherein the mathematical process used for analyzing the distribution characteristics and determining the optimal value for setting the automatic timer is selecting the highest value of the ultimate values collected in the data base.

* * * * *